United States Patent
Yoshioka et al.

(10) Patent No.: US 6,954,135 B1
(45) Date of Patent: Oct. 11, 2005

(54) EMERGENCY COMMUNICATION SYSTEM

(75) Inventors: Kenji Yoshioka, Yokohama (JP); Yasutoshi Nakama, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/937,628

(22) PCT Filed: Jan. 27, 2000

(86) PCT No.: PCT/JP00/00426
§ 371 (c)(1),
(2), (4) Date: Nov. 20, 2001

(87) PCT Pub. No.: WO01/55677
PCT Pub. Date: Aug. 2, 2001

(30) Foreign Application Priority Data
Jul. 27, 1998 (JP) .......................... 10-210972

(51) Int. Cl.[7] .............................. H04Q 1/00
(52) U.S. Cl. .................. 340/5.72; 340/426.2; 340/436; 455/404.2
(58) Field of Search .............................. 340/426.2, 436, 340/5; 342/357.09; 455/404.2, 346; 713/300; 74/411.5; 180/287; 701/1

(56) References Cited

U.S. PATENT DOCUMENTS

| | | | | |
|---|---|---|---|---|
| 5,179,868 A | * | 1/1993 | Thibeault | 74/411.5 |
| 5,311,197 A | * | 5/1994 | Sorden et al. | 342/357.09 |
| 5,537,673 A | * | 7/1996 | Nagashima et al. | 455/346 |
| 5,555,286 A | * | 9/1996 | Tendler | 455/404.2 |
| 5,570,756 A | * | 11/1996 | Hatcher | 180/287 |
| 5,917,405 A | | 6/1999 | Joao | |
| 5,969,598 A | * | 10/1999 | Kimura | 340/539.1 |
| 6,211,777 B1 | * | 4/2001 | Greenwood et al. | 340/436 |
| 6,282,464 B1 | * | 8/2001 | Obradovich | 701/1 |
| 6,690,302 B1 | * | 2/2004 | Inomata | 340/426.2 |
| 6,732,020 B2 | * | 5/2004 | Yamagishi | 340/436 |
| 2002/0032876 A1 | * | 3/2002 | Okagaki et al. | 713/300 |

* cited by examiner

Primary Examiner—Brian Zimmerman
(74) Attorney, Agent, or Firm—Connolly Bove Lodge & Hutz LLP

(57) ABSTRACT

An emergency communication system is installed on a vehicle for transmitting emergency information such as traffic accident, sudden illness, etc. to a center such as police station. It is used for the purpose of preventing inadvertent neglect of the connection of a handy phone to the system terminal unit when the handy phone is used as the emergency communication conveying means. In case it is not connected normally, a signal is set to a vehicle starting system 4 to prohibit the starting operation of the vehicle. This information is displayed on LED or LCD on a dashboard of the vehicle by the information transmitting means 6, and it is further stored in a storage unit 15 so that it can be picked up from outside via an external equipment connection interface 7.

7 Claims, 7 Drawing Sheets

EMERGENCY COMMUNICATION SYSTEM

TECHNICAL FIELD

The present invention relates to an emergency communication system, and in particular, to an emergency communication system installed on a vehicle and used for transmitting emergency communication to police station, emergency communication center, etc. via radio communication.

BACKGROUND ART

Conventionally, an emergency communication system has been known, which can transmit data such as the present position of a vehicle, registered number of a vehicle, etc. to a center for controlling emergency communication system such as police station, emergency communication center, etc. These data are transmitted via emergency communication conveying means such as a handy phone installed on the vehicle in an emergency, e.g. traffic accident, sudden illness, etc. when a user is driving a vehicle.

However, the conventional type emergency communication system uses a special-purpose radio device, e.g. a handy phone, as the emergency communication conveying means. For the purpose of ensuring the reliable emergency communication operations, the handy phone cannot be removed or detached. In this respect, the handy phone cannot be taken out from the vehicle and used in the same manner as an ordinary type portable telephone although it has normal function as a telephone set. To use the handy phone for such purpose, it is necessary to provide another handy phone.

DISCLOSURE OF THE INVENTION

To solve the above problems, it is an object of the present invention to provide an emergency communication system, in which the emergency communication conveying means serving as a communication device can be removed from the emergency communication system terminal unit and can be used outside the vehicle in the same manner as an ordinary type portable telephone set.

It is another object of the present invention to provide an emergency communication system, in which, when the removable type emergency communication conveying means as described above is detached or removed from the emergency communication system terminal unit, it is possible to reliably connect the conveying means, i.e. the handy phone, by notifying the user of such detachment.

To solve the above problems, according to the emergency communication system of the present invention, the emergency communication conveying means is connected to the emergency communication system terminal unit so that signals can be transmitted and received and reliable operation is assured. Also, it is designed in such manner that, if the emergency communication conveying means is not connected normally or if it is not operated, the vehicle cannot be started. Thus, perfect fulfillment of the functions as the emergency communication system is guaranteed, and emergency information can be reliably transmitted in an emergency. As a result, when the emergency communication conveying means is removed or removed from the emergency communication system terminal unit, the vehicle cannot be started unless it is mounted on the emergency communication system terminal unit again, and perfect fulfillment of the functions as the emergency communication system can be assured.

Also, when the emergency communication conveying means is removed from the emergency communication system terminal unit, this removal is notified to the user to ensure reliable connection.

According to a basic aspect of the present invention, there is provided an emergency communication system, which comprises an emergency communication system terminal unit installed on a vehicle, to which emergency communication conveying means is connected in such manner that signals can be transmitted and received and an emergency information is transmitted to a center for emergency communication system via the emergency communication conveying means, whereby there is provided means for detecting whether or not the emergency communication system terminal unit installed on the vehicle is connected in such manner that signals can be transmitted and received to and from the emergency communication system terminal unit installed on the vehicle. If it is not connected, the starting of the vehicle is prohibited. According to a status information to confirm whether or not the emergency communication conveying means is connected to the emergency communication system terminal unit, a protecting condition to restrict operation is added to the vehicle starting system. By inputting the status information indicating that the emergency communication conveying means is connected to the emergency communication system, the shifting to vehicle operation such as engine starting is turned to enable status. Then, it is confirmed that the emergency communication conveying means is normally connected or normally operated using radio communication device commonly adopted in the emergency communication system. By turning the starting operation of the vehicle to enable status, it is possible to maintain reliable operation of the emergency communication conveying means while the vehicle is being driven.

According to another aspect of the present invention, there is provided an emergency communication system of the basic aspect of the invention, wherein the emergency communication conveying means is connected to the emergency communication system terminal unit via an electronic device installed on the vehicle. According to a status information to confirm that the emergency communication conveying means is connected to the vehicle, a protecting condition to restrict operation is added to the vehicle starting system. When a status information is outputted, notifying that the emergency communication conveying means is connected to the vehicle, from the emergency communication conveying means to the emergency communication system terminal unit, the emergency communication system terminal unit outputs a status information to control the vehicle starting system. Based on the status information from the emergency communication system, the vehicle starting system, which turns the shifting to the vehicle operation such as engine starting to enable status, confirms that the emergency communication conveying means using radio communication is connected normally or is operating normally. Then, by turning the starting operation of the vehicle to enable status, it is possible to maintain reliable operation of the emergency communication conveying means while the vehicle is being driven.

According to another aspect of the present invention, there is provided an emergency communication system for prohibiting operation of the vehicle starting system when a signal indicating normal operation is not received from an external interface of the emergency communication conveying means in the above basic aspect of the invention. Based on an external interface signal of the emergency communication conveying means such as radio device, a status information is outputted, indicating that the emergency communication conveying means 2 is connected to the system with external interface such as the vehicle or the emergency communication system terminal unit, to which the emergency communication conveying means is connected. The system with the external interface, to which the emergency communication conveying means is connected, controls starting or advancing movement of the vehicle according to the above status information, and it is possible to maintain reliable operation of the conveying means while the vehicle is being driven.

According to still another aspect of the present invention, there is provided an emergency communication system of the above basic aspect of the invention, wherein a handy phone is used as the emergency communication conveying means. The handy phone is used as the emergency communication conveying means, and using the external interface of the handy phone, a status information is inputted, indicating that the emergency communication conveying means is connected by the handy phone. The system having external interface such as the vehicle or the emergency communication system terminal unit, to which the handy phone is connected, maintains reliable operation of the emergency communication conveying means while the vehicle is being driven by controlling the starting or the advancing movement of the vehicle according to the above status information.

According to still another aspect of the present invention, there is provided an emergency communication system of the above basic aspect of the invention, wherein operation of the vehicle starting system is prohibited when a signal indicating normal operation is not received using a serial signal for the control of the external interface of the handy phone. A handy phone is used as the emergency communication conveying means, and using a non-synchronizing serial signal for control of the external interface signal of the handy phone, a status information is inputted by the handy phone, indicating that the emergency communication conveying means is connected. The system having external interface such as the vehicle or the emergency communication system terminal unit, to which the handy phone is connected, maintains reliable operation of the conveying means while the vehicle is being driven by controlling the starting or the advancing movement of the vehicle according to the status information outputted from the serial signal.

According to still another aspect of the present invention, there is provided an emergency communication system of the above basic aspect of the invention, wherein operation of the vehicle starting system is prohibited when a signal indicating normal operation is not received using a digital communication signal called TCH signal of the external interface of the handy phone. A handy phone is used as the emergency communication conveying means, and using synchronizing serial signal (TCH signal) for data communication of external interface signal of the handy phone, a status information, indicating that the emergency communication conveying means 2 is connected, is inputted by the handy phone. The system with the external interface such as the vehicle or the emergency communication system terminal unit, to which the handy phone is connected, maintains reliable operation of the conveying means while the vehicle is being driven by controlling the starting or the advancing movement of the vehicle according to the status information outputted from the TCH signal.

According to still another aspect of the present invention, there is provided an emergency communication system of the above basic aspect of the invention, wherein the operation of the vehicle starting system is prohibited when a signal indicating normal operation is not received using a unit power control signal for power control of the handy phone. A handy phone is used as the emergency communication conveying means. Using the unit power control signal for power control of the unit connected to the handy phone of the external interface of the handy phone, a status information is inputted by the handy phone, indicating that the emergency communication conveying means is connected. The system with the external interface such as the vehicle or the emergency communication system terminal unit, to which the handy phone is connected, maintains reliable operation of the conveying means while the vehicle is being driven by controlling the starting or the advancing movement of the vehicle according to the status information outputted from the unit power control signal.

According to still another aspect of the present invention, there is provided an emergency communication system of the above basic aspect of the invention, wherein the operation of the vehicle starting system is prohibited when a normal telephone number is not received after collating with the telephone number specific to the handy phone. The telephone number specific to the handy phone is collated with the telephone number registered in the system with external interface such as the vehicle or the emergency communication system terminal unit, to which the handy phone is connected. By controlling the starting or the advancing movement of the vehicle based on the result of the above collating, reliable operation of the emergency communication conveying means is maintained while the vehicle is being driven.

According to still another aspect of the present invention, there is provided an emergency communication system of the above basic aspect of the invention, wherein operation of the vehicle starting system is prohibited when password numbers are collated using the function to register the password numbers of the handy phone and if normal password number is not collated. The password number of the handy phone is collated with the password number registered in the system with external interface such as the vehicle or the emergency communication system terminal unit, to which the handy phone is connected. By controlling the starting or the advancing movement of the vehicle based on the result of the above collating, reliable operation of the emergency communication conveying means is maintained when the vehicle is driven.

According to still another aspect of the present invention, there is provided an emergency communication system of the above basic aspect of the invention, using a personal handy phone system terminal telephone (PHS) as the emergency communication conveying means. A personal handy phone system terminal telephone (PHS) is used as the emergency communication conveying means, and using an external interface possessed by the PHS, a status information is inputted from the PHS, indicating that the conveying means is connected. The system having the external interface such as the vehicle or the emergency communication system terminal unit, to which the PHS is connected, maintains reliable operation of the emergency communication conveying means while the vehicle is being driven by controlling the starting or the advancing movement of the vehicle according to the above status information.

According to still another aspect of the present invention, there is provided an emergency communication system of the above basic aspect of the invention, using an MCA radio device as the emergency communication conveying means. An MCA radio device is used as the emergency communication conveying means, and using an external interface of the MCA radio device, a status information is inputted from the MCA radio device, indicating that the emergency communication conveying means is connected. The system with the external interface such as the vehicle or the emergency communication system terminal unit, to which the MCA radio device is connected, maintains reliable operation of the emergency communication conveying means while the vehicle is being driven by controlling the starting or the advancing movement of the vehicle according to the status information.

According to still another aspect of the present invention, there is provided an emergency communication system using a personal radio device as the emergency communication conveying means. A personal radio device is used as the emergency communication conveying means, and using an external interface of the personal radio device, a status information is inputted from the personal radio device, indicating that the emergency communication conveying means is connected. The system with the external interface such as the vehicle or the emergency communication system terminal unit, to which the personal radio device is connected, maintains reliable operation of the emergency communication conveying means while the vehicle is being driven by controlling the starting or the advancing movement of the vehicle according to the status information.

According to still another aspect of the present invention, there is provided an emergency communication system using an amateur radio device as the emergency communication conveying means. An amateur radio device is used as the emergency communication conveying means, and using an external interface of the amateur radio device, a status information is inputted from the amateur radio device, indicating that the emergency communication conveying means 2 is connected. The system with the external interface such as the vehicle or the emergency communication system terminal unit, to which the amateur radio device is connected, maintains reliable operation of the emergency communication conveying means while the vehicle is being driven by controlling the starting or the advancing movement of the vehicle according to the status information.

According to still another aspect of the present invention, there is provided an emergency communication system of the above basic aspect of the invention, wherein the operation of the vehicle starting system is prohibited by preventing the turning of a key in a direction to start the engine even when the key to start the engine is inserted into ignition switch. On the side to receive the key for starting the engine, a mechanism is provided to restrict the condition for the release, i.e. to turn the key, according to the status information indicating that the emergency communication conveying means is connected. By inputting the status information indicating that the emergency communication conveying means is connected, the restriction on the side to receive the key is released, and reliable operation of the emergency communication conveying means is maintained while the vehicle is being driven.

According to still another aspect of the present invention, there is provided an emergency communication system of the above basic aspect of the invention, wherein the operation of the vehicle starting system is prohibited by preventing the insertion of the key for starting the engine into ignition switch. A mechanism to restrict the condition of the release, i.e. to insert the key, according to the status information indicating that the emergency communication conveying means is connected, is provided on the side to receive the key for starting the engine. By inputting the status information indicating that the emergency communication conveying means is connected, the restriction on the side to receive the key is released, and reliable operation of the emergency communication conveying means is maintained while the vehicle is being driven.

According to still another aspect of the present invention, there is provided an emergency communication system of the above basic aspect of the invention, wherein the operation of the vehicle starting system is prohibited by preventing the shifting of a shift lever from parking range to the other range in case automatic transmission is adopted in the vehicle. On the automatic transmission, a mechanism to restrict the condition of the release is provided, and this makes it possible to release from the parking range according to a status information indicating that the emergency communication conveying means is connected. By inputting the status information indicating that the emergency communication conveying means is connected, the restriction on the shifting from parking range of the automatic transmission is released, and reliable operation of the emergency communication conveying means is maintained while the vehicle being is driven.

According to still another aspect of the present invention, there is provided an emergency communication system of the above basic aspect of the invention, wherein the operation of the vehicle starting system is prohibited by preventing the shifting from neutral gear position in case manual transmission is adopted in the vehicle. On the manual transmission, a mechanism is provided to restrict the condition of the release to permit the shifting from neutral gear position according to the status information indicating that the emergency communication conveying means is connected. By inputting the status information indicating that the emergency communication conveying means is connected, the restriction on the shifting from the neutral gear position of the manual transmission is released, and reliable operation of the emergency communication conveying means is maintained while the vehicle is being driven.

According to still another aspect of the present invention, there is provided an emergency communication system of the above basic aspect of the invention, wherein the operation of the vehicle starting system is prohibited by preventing the release of the parking brake. According to a status information indicating that the emergency communication conveying means is connected, a mechanism to restrict the condition of the release is provided on the parking brake to permit the release of the brake. By inputting the status information indicating that the emergency communication conveying means is connected, the parking brake is released, and reliable operation of the emergency communication conveying means is maintained while the vehicle is being driven.

According to still another aspect of the present invention, there is provided an emergency communication system of the above basic aspect of the invention with means for transmitting information to the user that the emergency communication conveying means is not connected when the emergency communication conveying means is not connected to the emergency communication system terminal unit installed on the vehicle. When the emergency communication conveying means such as radio communication device is not connected to the emergency communication system terminal unit installed on the vehicle, the status information indicating that the conveying means is not connected is outputted to the information transmitting means such as buzzer, LED, etc. for transmitting the information to the user. Based on the status information, the information transmitting means transmits the information that it is not connected by the means such as sound, illumination, display, etc. to the user, and reliable operation of the emergency communication conveying means is maintained while the vehicle is being driven.

According to still another aspect of the present invention, there is provided an emergency communication system of the above basic aspect of the invention, wherein, the system comprises means for transmitting information to the user that the emergency communication conveying means is not connected under the condition that power is connected for engine starting when the emergency communication conveying means is not connected to the emergency communication system terminal unit installed on the vehicle. Under the condition that power is connected for engine starting, when the emergency communication conveying means such as radio communication device is not connected to the emergency communication system terminal unit installed on the vehicle, the status information indicating that it is not connected is outputted to the information transmitting means such as buzzer, LED, etc. for transmitting information to the user. Based on the status information, the information transmitting means transmits the information that it is not connected to the user by sound, illumination, display, etc.

According to still another aspect of the present invention, there is provided an emergency communication conveying means such as radio device, using lighting of indicator such as lamp, LED, etc. as the means for transmitting the information that the emergency communication conveying means is not connected. When the emergency communication conveying means such as radio communication device is not connected to the emergency communication system terminal unit installed on the vehicle, the status information indicating that it is not connected is outputted to the information transmitting means by indicator such as lamp, LED, etc. Based on the status information, the information transmitting means by the indicator lights up the indicator and transmits the information that it is not connected to the user, and reliable operation of the emergency communication conveying means is maintained while the vehicle is being driven.

According to still another aspect of the present invention, there is provided an emergency communication conveying means such as radio device, using lighting of indicator such as lamp, LED, etc. as the means for transmitting the information that the emergency communication conveying means is not connected. When the emergency communication conveying means such as radio communication device is not connected to the emergency communication system terminal unit installed on the vehicle, the status information indicating that it is not connected is outputted to the information transmitting means by indicator such as lamp, LED, etc. Based on the status information, the information transmitting means flashes the indicator and transmits the information that it is not connected to the user, and reliable operation of the emergency communication conveying means is maintained while the vehicle is being driven.

According to still another aspect of the present invention, there is provided an emergency communication conveying means such as radio device, wherein display means such as LCD is mounted on a dashboard where instruments such as speedometer are arranged, and this means is used as the means for transmitting the information that the emergency communication conveying means is not connected. When the emergency communication conveying means such as radio communication device is not connected to the emergency communication system terminal unit installed on the vehicle, the indicator such as lamp, LED, etc. is used for the status information indicating that it is not connected. This means is mounted on the dashboard where there are provided the instruments most effectively received by visual perception of the driver. The information that it is not connected is transmitted to the user, and reliable operation of the emergency communication conveying means is maintained while the vehicle is being driven.

According to still another aspect of the present invention, there is provided an emergency communication system of the above basic aspect of the invenbon, wherein an indicator such as LED for transmitting the information that the emergency communication conveying means is not connected is mounted on a dashboard where instruments such as speedometer are arranged. When the emergency communication conveying means such as radio communication device is not connected to the emergency communication system terminal unit installed on the vehicle, the indicator such lamp, LED, etc. is used for the status information indicating that it is not connected, and this is mounted on the dashboard where there are provided the instruments most effectively received by visual perception of the driver. The information that it is not connected is transmitted to the user, and reliable operation of the emergency communication conveying means is maintained while the vehicle is being driven.

According to still another aspect of the present invention, there is provided an emergency communication system of the above basic aspect of the invention, wherein display means such as LCD is mounted on a dashboard where instruments such as speedometer are arranged. This means is used for transmitting the information that the emergency communication conveying means is not connected. When the emergency communication conveying means such as radio communication device is not connected to the emergency communication system terminal unit installed on the vehicle, the means for character display such as LCD, CRT, etc. is used for transmitting the status information indicating that it is not connected. This means is mounted on the dashboard when the instruments most effectively received by visual perception of the driver. The information indicating that the conveying means is not connected is transmitted to the user, and reliable operation of the emergency communication conveying means is maintained while the vehicle is being driven.

According still another aspect of the present invention, there is provided an emergency communication system of the above basic aspect of the invention, using voice based on voice synthetic signal as the means for transmitting the information that the emergency communication conveying means is not connected. When the emergency communication conveying means such as radio communication device is not connected to the emergency communication system terminal unit installed on the vehicle, the status information indicating that the conveying means is not connected is outputted to the information transmitting means using voice output means applying voice synthesis. Based on the status information, the information transmitting means based on voice output transmits the information that it is not connected to the user by means of voice, and reliable operation of the emergency communication conveying means is maintained while the vehicle is being driven.

According still another aspect of the present invention, there is provided an emergency communication system of the above basic aspect of the invention, using alarm sound such as beep sound as the means for transmitting the information that the emergency communication conveying means is not connected. When the emergency communication conveying means such as radio communication device is not connected to the emergency communication system terminal unit installed on the vehicle, the status information indicating that the conveying means is not connected is outputted to the information transmitting means using alarm sound output means based on alarm sound output. Based on the status information, the information transmitting means based on alarm sound transmits the information that it is not connected to the user using alarm sound, and reliable operation of the emergency communication conveying means is maintained while the vehicle is being driven.

According to still another aspect of the present invention, there is provided an emergency communication system of the above basic aspect of the invention, wherein, when the emergency communication conveying means is not connected to the emergency communication system terminal unit installed on the vehicle, the system comprises means for recording the information that the emergency communication conveying means is not connected, and this is recorded as history. When the emergency communication conveying means such as radio communication device is not connected to the emergency communication system terminal unit installed on the vehicle, the information that it is not connected is outputted to storage means such as memory. Based on the status information, the storage means stores the data on the non-connection and records it as history.

According to still another aspect of the present invention, there is provided an emergency communication system of the above basic aspect of the invention, wherein, when the emergency communication conveying means is not connected to the emergency communication system terminal unit installed on the vehicle, an alarm is issued to indicate that the emergency communication conveying means is not connected, and this is recorded as history. When the information, indicating that the emergency communication conveying means such as radio communication device is not connected to the emergency communication system terminal unit, is outputted to the user as an alarm such as display, sound, etc., the information that the alarm has been issued is outputted to the storage means such as memory. Based on the status information, the storage means stores the data that the alarm has been issued, and this is recorded as history.

According to still another aspect of the present invention, there is provided an emergency communication system of the above basic aspect of the invention with means for picking up history from an external equipment when the emergency communication conveying means such as radio communication device is not connected to the emergency communication system terminal unit installed on a vehicle. History is picked up from the external equipment, i.e. a history recording that the emergency communication conveying means is not connected or a history recording that an alarm has been issued to indicate that the emergency communication conveying means is not connected. The information that it is not connected or that an alarm on the non-connection has been issued to the user is stored in the storage means such as memory. Further, a status information is received, which indicates a request of the data stored in the storage means by an externally connected equipment, and the storage means outputs the data indicating that the conveying means is not connected or that the alarm on the non-connection has been issued to the user to the externally connected equipment according to the status information.

According to still another aspect of the present invention, there is provided an emergency communication system of the above basic aspect of the invention, using non-synchronizing serial signal as the means to pick up history, i.e. a history recording that the emergency communication conveying means is not connected or a history recording the issuance of an alarm on the non-connection of the emergency communication conveying means. The information indicating that the conveying means is not connected or an alarm on the non-connection has been issued to the user is stored in the storage means such as memory. When a status information indicating a request of the data stored in the storage means is received from an externally connected equipment using non-synchronizing serial signal, the storage means outputs the data indicating that the conveying means is not connected or an alarm on the non-connection has been issued to the user to the externally connected equipment based on the status information using the non-synchronizing serial signal.

According to still another aspect of the present invention, there is provided an emergency communication system of the above basic aspect of the invention, using synchronizing serial signal as the means to pick up history, i.e. a history recording that the emergency communication conveying means is not connected or a history recording the issuance of an alarm on the non-connection of the emergency communication conveying means. The information indicating that the conveying means is not connected or an alarm on the non-connection has been issued to the user is stored in the storage means such as memory. When a status information indicating a request of the data stored in the storage means is received from an externally connected equipment using synchronizing serial signal, the storage means outputs the data indicating that the conveying means is not connected or an alarm on the non-connection has been issued to the user to the externally connected equipment based on the status information using the synchronizing serial signal.

According to still another aspect of the present invention, there is provided an emergency communication system of the above basic aspect of the invention, using bus communication signal as the means to pick up history, i.e. a history recording that the emergency communication conveying means is not connected or a history recording the issuance of an alarm on the non-connection of the emergency communication conveying means. The information indicating that the conveying means is not connected or an alarm on the non-connection has been issued to the user is stored in the storage means such as memory. When a status information indicating a request of the data stored in the storage means is received from an externally connected equipment using bus communication signal, the storage means outputs the data indicating that the conveying means is not connected or an alarm on the non-connection has been issued to the user to the externally connected equipment based on the status information using the bus communication signal.

According to still another aspect of the present invention, there is provided an emergency communication system of the above basic aspect of the invention, using LAN signal as the means to pick up history, i.e. a history recording that the emergency communication conveying means is not connected or a history recording the issuance of an alarm on the non-connection of the emergency communication conveying means. The information indicating that the conveying means is not connected or an alarm on the non-connection has been issued to the user is stored in the storage means such as memory. When a status information indicating a request of the data stored in the storage means is received from an externally connected equipment using LAN signal, the storage means outputs the data indicating that the conveying means is not connected or an alarm on the non-connection has been issued to the user to the externally connected equipment based on the status information using the LAN signal.

According to still another aspect of the present invention, there is provided an emergency communication system of the above basic aspect of the invention, using infrared signal as the means to pick up history, i.e. a history recording that the emergency communication conveying means is not connected or a history recording the issuance of an alarm on the non-connection of the emergency communication conveying means. The information indicating that the conveying means is not connected or an alarm on the non-connection has been issued to the user is stored in the storage means such as memory. When a status information indicating a request of the data stored in the storage means is received from an equipment externally connected via infrared communication using infrared communication signal, the storage means outputs the data indicating that the conveying means is not connected or an alarm on the non-connection has been issued to the user to the externally connected equipment based on the status information using the infrared communication signal.

According to still another aspect of the present invention, there is provided an emergency communication system of the above basic aspect of the invention, using radio signal based on electric waves as the means to pick up history, i.e. a history recording that the emergency communication conveying means is not connected or a history recording the issuance of an alarm on the non-connection of the emergency communication conveying means. The information indicating that the conveying means is not connected or an alarm on the non-connection has been issued to the user is stored in the storage means such as memory. When a status information indicating a request of the data stored in the storage means is received from an equipment externally connected via radio communication using radio communication signal, the storage means outputs the data indicating that the conveying means is not connected or an alarm on the non-connection has been issued to the user to the externally connected equipment based on the status information using the radio communication signal.

According to still another aspect of the present invention, there is provided an emergency communication system of the above basic aspect of the invention, wherein, when the emergency communication conveying means such as radio communication device is not normally connected to the emergency communication system terminal unit, a status information indicating that it is not possible to confirm normal connection is outputted to the information transmitting means such as buzzer, LED, etc. for transmitting information to the user. Based on the status information, the information transmitting means transmits to the user the information that it is not normally connected by means such as sound, illumination, display, etc., and reliable operation of the emergency communication conveying means is maintained while the vehicle is being driven.

According to still another aspect of the present invention, there is provided an emergency communication system of the above basic aspect of the invention, wherein the emergency communication conveying means is connected to the emergency communication system terminal unit installed on a vehicle, and an emergency information is sent to a center for emergency communication control via the emergency communication conveying means. A handy phone is used as the emergency communication conveying means, and the emergency communication conveying means is connected to the emergency communication system terminal unit via an electronic device with an interface to connect the emergency communication conveying means, and engine starting is turned to enable status. According to status information confirming that the emergency communication conveying means is connected to the vehicle or the emergency communication system terminal unit, the shifting to vehicle operation such as engine starting is turned to enable status. Based on the status information from the emergency communication system terminal unit, the vehicle starting system confirms that the emergency communication conveying means using radio communication device is normally connected or operated, and by turning the advancing operation of the vehicle to enable status, reliable operation of the emergency communication conveying means is maintained while the vehicle is being driven. For example, in the arrangement of the present system, the emergency communication conveying means is used instead of a key to operate the vehicle, and the vehicle can be started simply by the emergency communication conveying means.

According to still another aspect of the present invention, there is provided an emergency communication system of the above basic aspect of the invention, wherein, when a handy phone used as the emergency communication conveying means is removed from the emergency communication system terminal unit, a status information indicating that the emergency communication conveying means has been removed is outputted to the information transmitting means such as buzzer, LED, etc. for transmitting information to the user. Based on the status information, the information transmitting means transmits the information that the emergency communication conveying means has been removed to the user by means such as sound, illumination, display, etc., and reliable operation of the emergency communication conveying means is maintained while the vehicle is being driven.

According to still another aspect of the present invention, there is provided an emergency communication system of the above basic aspect of the invention, wherein, when a condition requiring issuance of emergency information such as traffic accident occurs, telephone transmission processing is started to a center for the control of the emergency communication system using emergency communication conveying means such as radio communication device, and data such as advancing direction of the vehicle or position information are transmitted to the center for the control of the emergency communication system. The present system comprises an emergency communication system terminal unit, an emergency communication conveying means, a communication antenna, and a vehicle starting system. The emergency communication system terminal unit is provided with the function to transmit the emergency communication and also to transmit information such as advancing direction of the vehicle, data such as position information, etc. to a communication partner (i.e. the other party of the communication) to a center, which controls the emergency communication system. The emergency communication conveying means is the means such as a handy phone with the functions to start telephone transmission to a telephone number of a center for controlling the emergency communication system via a base station of a communication firm when there is a request for communication transmission from the emergency communication system terminal unit. Further, when a response from the communication partner or a signal is received from the communication partner indicating that the line is busy, it is recognized that it has been shifted to communication status, and it is switched over to voice communication control or data communication control. Then, information such as advancing direction of the vehicle and data such as position information are transmitted to the center for controlling the emergency communication system corresponding to the telephone number via a base station of a communication firm. The communication antenna transmits a transmission signal from the emergency communication conveying means to a base station of a communication firm and outputs a receiving signal from the communication firm to the emergency communication conveying means. The vehicle starting system controls advancing operation of the vehicle and comprises an engine starting system for starting an engine of the vehicle using a key for starting only a specific vehicle, and a vehicle operating system such as gear, clutch, etc. to start the vehicle.

BEST MODE FOR CARRYING OUT THE INVENTION

Figure 1:
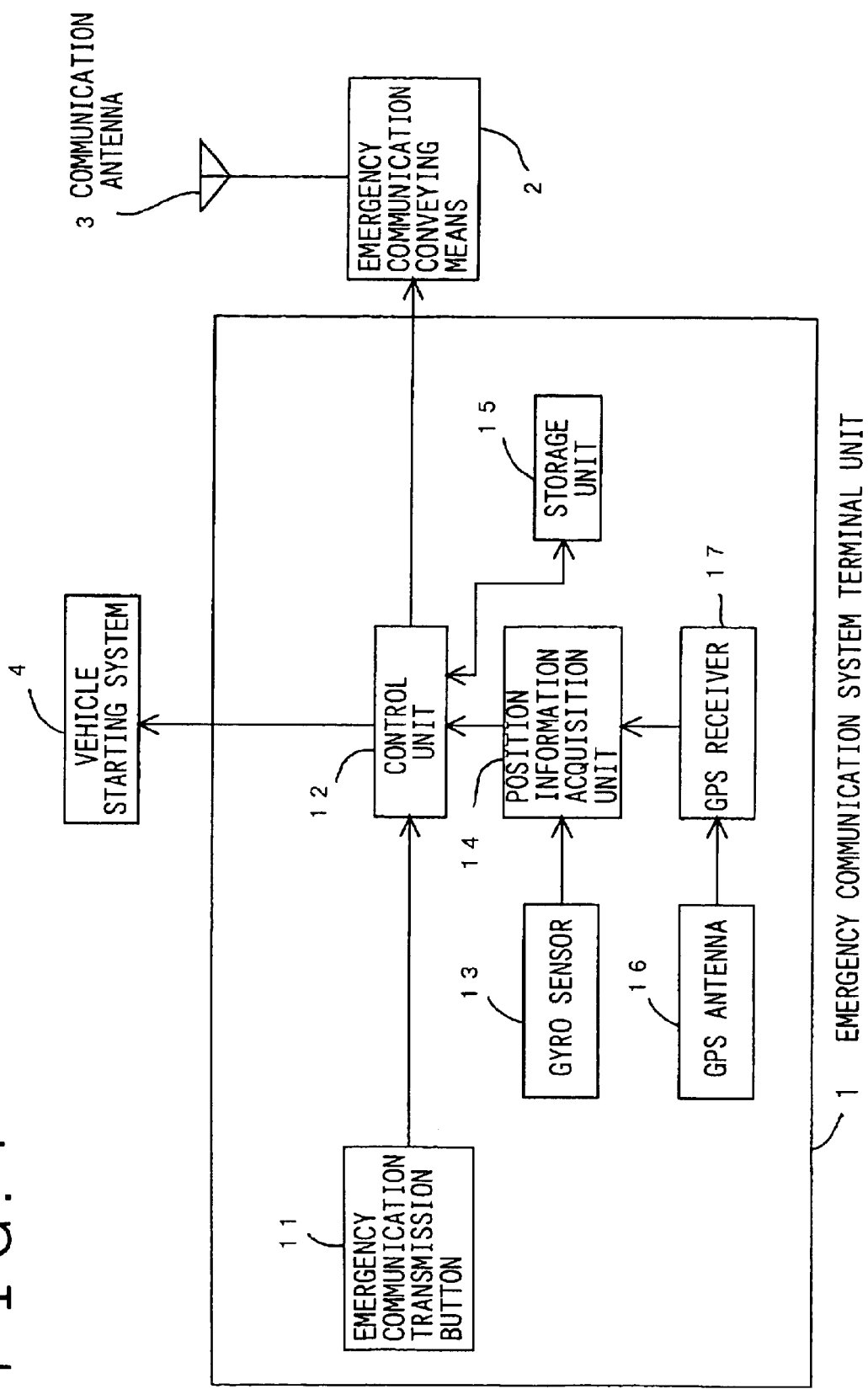
FIG. 1 is a block diagram of an arrangement of an emergency communication system in a first embodiment and others of the present invention.

In the following, detailed description will be given on embodiments of the emergency communication system of the present invention referring to the drawings.
(Embodiment 1)

FIG. 1 is a block diagram of an arrangement of a first embodiment of an emergency communication system of the present invention. This first embodiment of the invention is used, for example, when requesting dispatch of a vehicle from police station or fire department in an emergency such as traffic accident, sudden illness, etc. Specifically, when an emergency situation such as traffic accident occurs to a vehicle, which is provided with an emergency communication system, the system of the present embodiment starts telephone transmission processing to a center, which controls the emergency communication system using conveying means 2 such as radio communication device. This first embodiment comprises an emergency communication system terminal unit 1, an emergency communication conveying means 2, a communication antenna 3, and a vehicle starting system 4. The emergency communication system terminal unit 1 is provided with the function to transmit the emergency communication and also to transmit information such as advancing direction of the vehicle, data such as position information, etc. to a communication partner (i.e. the other party of the communication) to a center, which controls the emergency communication system. The emergency communication conveying means 2 is the means such as a handy phone with the functions to start telephone transmission to a telephone number of a center for controlling the emergency communication system via a base station of a communication firm when there is a request for communication transmission from the emergency communication system terminal unit 1. Further, when a response from the communication partner or a signal is received from the communication partner indicating that the line is busy, it is recognized that it has been shifted to communication status, and it is switched over to voice communication control or data communication control. Then, information such as advancing direction of the vehicle and data such as position information are transmitted to the center for controlling the emergency communication system corresponding to the telephone number via a base station of a communication firm. The communication antenna 3 transmits a transmission signal from the emergency communication conveying means 2 to a base station of a communication firm and outputs a receiving signal from the communication firm to the emergency communication conveying means 2. The vehicle starting system 4 controls advancing operation of the vehicle and comprises an engine starting system for starting an engine of the vehicle using a key for starting only a specific vehicle, and a vehicle operating system such as gear, clutch, etc. to start the vehicle.

In the emergency communication system terminal unit 1, reference numeral 11 denotes an emergency communication transmission button. When this button is pressed by a user in an emergency such as traffic accident, sudden illness, etc., an operation signal for starting transmission processing is generated. Reference numeral 12 represents a control unit for controlling the entire system 1, reference numeral 13 denotes a gyro sensor for detecting advancing direction of the vehicle, 14 is a position information acquisition unit for generating position information based on a signal from the gyro sensor 13 and a signal from a GPS receiver 17, 15 is a storage unit for storing various types of data, 16 is a GPS antenna for receiving data from satellites, 17 represents a GPS receiver for detecting the present position of the vehicle from the data received from the GPS antenna.

The control unit 12 recognizes that there has been an emergency communication request based on the operation signal from the emergency communication transmission button 11 and outputs a signal for requesting the present position to the position information acquisition unit 14 in order to start emergency communication processing. At the same time, information such as advancing direction of the vehicle and data such as position information are inputted from the position information acquisition unit 14. Further, a telephone number of the center for controlling the emergency communication system such as police station, emergency communication center, etc. is acquired from the storage unit 15. Then, using the telephone number, telephone transmission is requested to the emergency communication conveying means 2. Further, in case a response or a signal such as communication signal, indicating that it is shifted to communication status, is received from the communication partner corresponding to the above telephone number, it is recognized that it has been shifted to communication status. Then, the information such as advancing direction of the vehicle obtained from the position information acquisition unit 14 and data such as position information are transmitted to the center for controlling emergency communication system, e.g. police station, emergency communication center, etc. corresponding to the above telephone number. These data are outputted to the emergency communication conveying means 2 via a base station of a communication firm. Also, a status information as to whether or not the emergency communication conveying means 2 is connected to the emergency communication system terminal unit 1 is outputted.

The gyro sensor 13 generates information such as advancing direction of the vehicle, and outputs this to the position information acquisition unit 14. In response to the signal to request position information from the control unit 12, the position information acquisition unit 14 receives the data from the gyro sensor 13 which generates the information such as advancing direction of the vehicle and also the data received from the GPS antenna 16 by the GPS receiver 17, and the data including position information is generated. Further, the data such as advancing direction of the vehicle inputted from the gyro sensor 13 and the data such as position information generated are outputted to the control unit 12.

The storage unit 15 stores various types of information including telephone number of the center for controlling the emergency communication system such as police station, emergency communication center, etc., registered number of the vehicle with the emergency communication system terminal unit installed on the vehicle, and registered number of person. By a request signal from the control unit 12, various types of information are outputted, including telephone number of the center for controlling emergency communication system such as police station, emergency communication center, etc., registered number of the vehicle with the emergency communication system terminal unit 1 installed on it, and registered number of person.

In response to the transmission requesting signal from the control unit 12, the emergency communication conveying means 2 starts telephone transmission to the communication partner corresponding to the above telephone number via a base station of a communication firm using the telephone number inputted from the control unit 12. When a response or a signal indicating that communication signal has been received from the communication partner, it is recognized that it has been shifted to communication status, and it is switched over to voice communication control or data communication control. Also, a signal indicating that it has been shifted to the communication status is outputted to the control unit 12. Further, the information such as advancing direction of the vehicle or data such as position information inputted from the control unit 12 are transmitted via the communication antenna 3 to the center for controlling the emergency communication system such as police station, emergency communication center, etc. corresponding to the telephone number via a base station of a communication firm.

The vehicle starting system 4 is provided with a protection mechanism. When it receives a status signal from the control unit 12, indicating that the emergency communication conveying means 2 is connected to the emergency communication system terminal unit 1, the vehicle starting operation such as engine starting can be performed. When the emergency communication conveying means 2 is not connected according to the status information for controlling vehicle operation, the operation to start the vehicle such as engine starting is turned to disable status.

Next, description will be given on operation of the first embodiment. In FIG. 1, the user presses the emergency communication button 11 in an emergency such as traffic accident, sudden illness, etc. When the button is pressed by the user, the emergency communication button 11 outputs an operating signal indicating that the button has been pressed to the control unit, which is provided in the emergency communication system terminal unit 1. The control unit 12 recognizes that there has been an emergency communication request based on the operation signal from the emergency communication button 11. Then, the emergency communication processing is started, and a signal requesting the present position information is outputted to the position information acquisition unit 14.

In response to the position information request signal from the control unit 12, the position information acquisition unit 14 inputs the data from the gyro sensor 13, which generates information such as advancing direction of the vehicle and also generates data such as position information based on the above data, and the data received from the GPS antenna 16 by the GPS receiver 17. The position information acquisition unit 14 outputs the data such as advancing direction of the vehicle inputted from the gyro sensor 13 and the data such as position information.

The control unit 12 acquires the telephone number of the center for controlling emergency communication system such as police station, emergency communication center, etc. from the storage unit 15, and requests telephone transmission to the emergency communication conveying means 2 using the above telephone number. Using the communication antenna 3, the emergency communication conveying means 2 starts telephone transmission processing to the communication partner corresponding to the telephone number via a base station of a communication firm. When a response or a signal indicating that communication signal is received from the communication partner, the emergency communication conveying means 2 recognizes that it has been shifted to communication status, and it is switched over to voice communication control or data communication control, and a signal indicating that it has been shifted to communication status is outputted to the control unit 12.

The control unit 12 judges that the communication has been successful, and the information such as advancing direction of the vehicle obtained from the position information acquisition unit 14 or the data including position information are transmitted to the center for controlling the emergency communication system such as police station, emergency communication center, etc., i.e. a communication partner corresponding to the telephone number, via a base station of a communication firm.

The vehicle starting system 4 receives the status information indicating that the emergency communication conveying means 2 is connected to the emergency communication system terminal unit 1 from the control unit 12. When the emergency communication conveying means 2 is not connected according to the status information, protection procedure is provided to turn the vehicle starting operation such as engine starting to disable status. When the emergency communication conveying means 2 is connected according to the status, the protection mechanism is released which prohibits the starting of the vehicle such as engine starting, and it is turned to a status to start the vehicle, e.g. engine starting.

(Embodiment 2)

Figure 2:
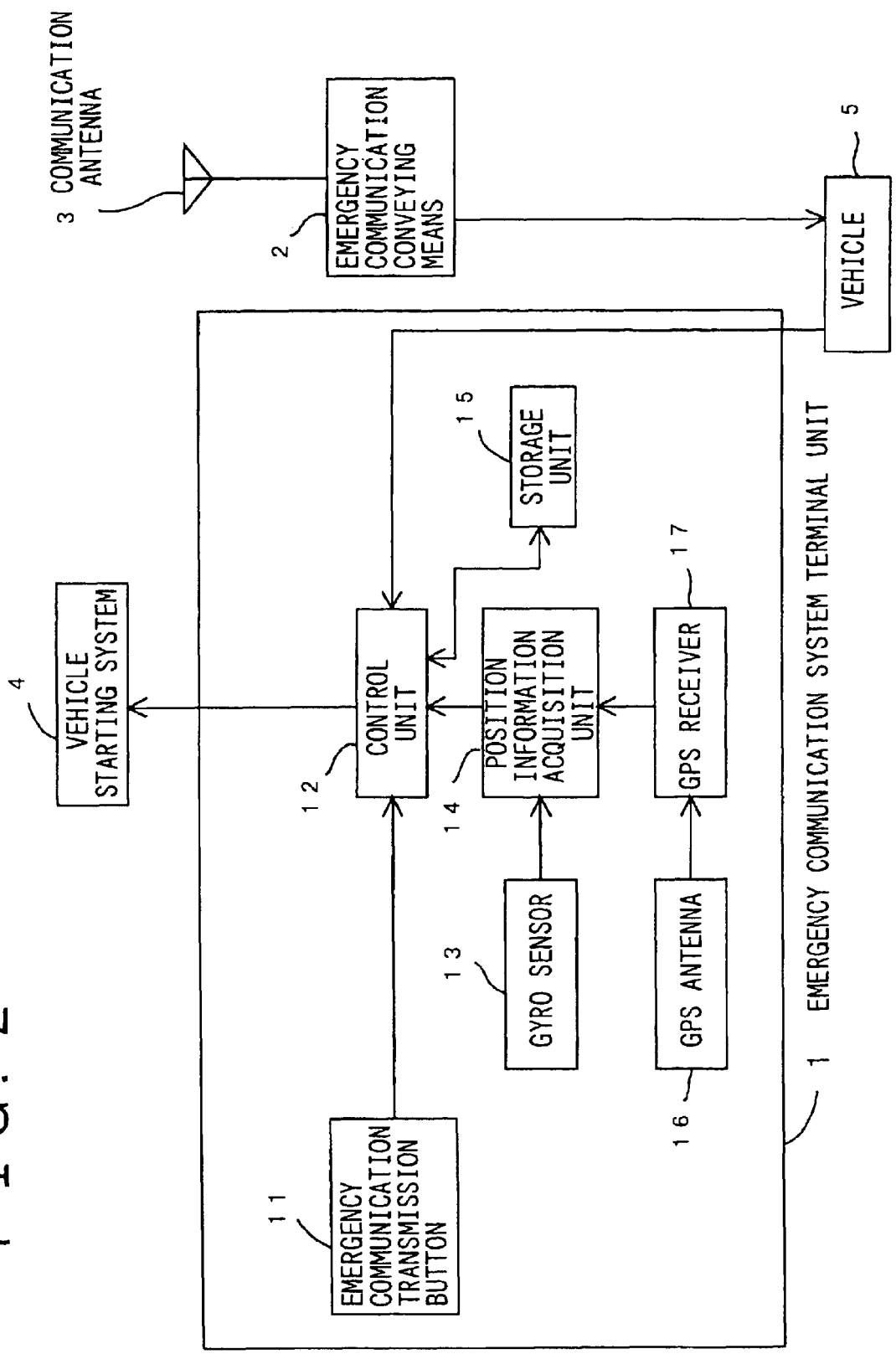
FIG. 2 is a block diagram of an arrangement of an emergency communication system in a second embodiment and others of the present invention.

FIG. 2 is a block diagram showing an arrangement of an emergency communication system in a second embodiment of the present invention. In FIG. 2, the emergency communication system comprises an emergency communication system terminal unit 1, emergency communication conveying means 2 such as handy phone connected to the vehicle 5, a communication antenna 3, a vehicle starting system 4, and a vehicle 5 to be used as the transport means such as an automobile. Normal operation of the emergency communication conveying means 2 using means such as radio communication device adopted for the emergency communication system is confirmed, and by turning to enable status to start the vehicle, reliable operation of the emergency communication conveying means 2 is maintained while the vehicle is being driven.

The vehicle starting system 4 receives a status information, indicating that the emergency communication conveying means 2 is connected via the vehicle 5. When the emergency communication conveying means 2 is not connected according to the status information, protection mechanism is operated which prohibits the starting operation of the vehicle such as engine starting. Thus, the starting operation of vehicle such as engine starting is turned to disable status. When the emergency communication conveying means 2 is connected according to the status information, protection mechanism is turned off, which prohibits the starting operation of vehicle such as engine starting, and it is now turned to enable status to start the vehicle such as engine starting.

(Embodiment 3)

Next, description will be given on an emergency communication system of the present invention in a third embodiment referring to FIG. 1. In FIG. 1, the emergency communication conveying means such as handy phone has an external interface (not shown). The emergency communication system terminal unit 1 provided with an external interface (not shown), to which the emergency communication conveying means 2 can be connected, is connected to the external interface (not shown) of the emergency communication conveying means 2. By performing communication using the same interface signal, it is possible to confirm that normal connection is achieved using the interface signal.

When it is confirmed using the interface signal that the emergency communication conveying means 2 is connected according to the status information indicating that it is connected, protection mechanism to prohibit the starting operation of the vehicle such as engine starting is turned off, and it is now possible to start the operation of the vehicle such as engine starting. When a handy phone is used in an example to achieve the third embodiment, it is possible to confirm that connection is made using a 16-core interface signal.

(Embodiment 4)

The emergency communication system of the present invention in a fourth embodiment is achieved using an external interface (not shown) of the handy phone, which serves as the emergency communication conveying means 2. The handy phone has an external interface (not shown), which inputs and outputs signals by a format called 16-core interface. The emergency communication system terminal unit 1 provided with an external interface (not shown), to which emergency communication conveying means 2 is connected, has the same interface as the 16-core interface. As a result, normal connection can be confirmed using a signal of the interface.

(Embodiment 5)

The emergency communication system of the present invention in a fifth embodiment is achieved using a serial control signal, i.e. an external interface signal (not shown) of the handy phone, which serves as the emergency communication means 2, and communication signal is transmitted and received at a communication rate of 600 bps. The handy phone possesses a transmitting/receiving signal called serial control signal on the 16-core interface and inputs and outputs the signal to and from the equipment connected to the emergency communication conveying means 2. The emergency communication system terminal unit 1 provided with an external interface (not shown), to which the emergency communication conveying means 2 is connected, has the same interface as the 16-core interface. By using the serial control signal of the interface, it is possible to confirm normal connection by a signal indicating that the connection is made.

(Embodiment 6)

The emergency communication system of the present invention in a sixth embodiment is achieved using a TCH signal, i.e. an external interface signal (not shown) of the handy phone, serving as the emergency communication means 2, and communication signal is transmitted and received at a communication rate of 9600 bps or more. The handy phone possesses a transmitting/receiving signal called TCH signal on the 16-core interface and inputs and outputs the signal to and from the equipment connected to the emergency communication conveying means 2. The emergency communication system terminal unit 1 having an external interface (not shown), to which the emergency communication conveying means 2 is connected, has the same interface as the 16-core interface. By using the TCH signal of the interface, it is possible to confirm the normal connection by a signal indicating that the connection is made.

(Embodiment 7)

The emergency communication system of the present invention in a seventh embodiment is achieved using a unit power control signal for controlling electric power of an external unit connected to the handy phone, i.e. a signal of an external interface (not shown) of the handy phone, which serves as the emergency communication conveying means 2. The handy phone possesses a transmitting/receiving signal called a unit power signal in the 16-core interface and inputs and outputs signals to and from an equipment connected to the emergency communication conveying means 2. The emergency communication system terminal unit 1 having the external interface (not shown), to which the emergency communication conveying means 2 is connected, has the same interface as the 16-core interface. By using the unit power control signal of the interface, it is possible to confirm normal connection by the signal indicating that the connection is made.

(Embodiment 8)

The emergency communication system of the present invention in an eighth embodiment is achieved using a telephone number data specific to the handy phone, which serves as the emergency communication conveying means. Each handy phone has a predetermined telephone number and the same number is registered as the telephone number to an equipment connected to the emergency communication means 2 such as the emergency communication system terminal unit 1. When it is connected to an equipment connected to the emergency communication conveying means 2, the emergency communication conveying means 2 outputs the telephone number to an externally connected equipment such as the emergency communication system terminal unit 1. The externally connected equipment such as the emergency communication system terminal unit 1 collates the telephone number data sent from the emergency communication conveying means 2 with the telephone number specific to the externally connected equipment such as the emergency communication system terminal unit 1. If these telephone numbers agree with each other, it is possible to confirm that normal connection is made.

(Embodiment 9)

The emergency communication system of the present invention in a ninth embodiment is achieved using a password possessed by the handy phone, which serves as the emergency communication conveying means 2. The handy phone has a password number which can be registered by the user and the same number as the password number is registered to the equipment to be connected to the emergency communication conveying means such as the emergency communication system terminal unit 1. The emergency communication conveying means 2 outputs the password number to the equipment to be connected to outside such as the emergency communication system terminal unit 1 when it is connected to the emergency communication conveying means. The externally connected equipment such as the emergency communication system terminal unit 1 collates the password number data sent from the emergency communication conveying means 2 with the password number of the externally connected equipment such as the emergency communication system terminal unit 1. When the password numbers agree with each other, it is possible to confirm that normal connection is made.

(Embodiment 10)

The emergency communication system of the present invention in a tenth embodiment is achieved using an external interface (not shown) of PHS (personal handyphone system), which serves as the emergency communication conveying means 2. PHS has an external interface (not shown), which inputs and outputs signals to be used for maintenance. The emergency communication system terminal unit having external interface (not shown), to which the emergency communication conveying means 2 is connected, has the same interface as the interface possessed by PHS, and it is possible to confirm that normal connection is made using signals possessed by the interface.

(Embodiment 11)

The emergency communication system of the present invention in an eleventh embodiment is achieved using an external interface (not shown) of an MCA radio device, which serves as the emergency communication conveying means 2. The MCA radio device is provided with an external interface (not shown), which inputs and outputs signals to be used for maintenance. The emergency communication system terminal unit 1 having the external interface (not shown), to which the emergency communication conveying means 2 is connected, has the same interface as the interface of the MCA radio device, and it is possible to confirm that normal connection is made using the signal of the interface.

(Embodiment 12)

The emergency communication system of the present invention in a twelfth embodiment is achieved using an external interface (not shown) of a personal radio device, which constitutes and serves as the emergency communication conveying means 2. The personal radio device is provided with an external interface (not shown), which inputs and outputs signals to be used for maintenance. The emergency communication system terminal unit 1 having the external interface (not shown), to which the emergency communication conveying means 2 is connected, has the same interface as the interface of the personal radio device. Using the signal possessed by the interface, it is possible to confirm that normal connection is made.

(Embodiment 13)

The emergency communication system of the present invention in a thirteenth embodiment is achieved using an external interface (not shown) of an amateur radio device, which constitutes and serves as the emergency communication conveying means 2. The amateur radio device is provided with the external interface (not shown), which inputs and outputs signals to be used for maintenance. The emergency communication system terminal unit 1 having the external interface (not shown), to which the emergency communication conveying means 2 is connected, has the same interface as the interface of the amateur radio device. Using the signal possessed by the interface, it is possible to confirm that normal connection is made.

(Embodiment 14)

Figure 3:
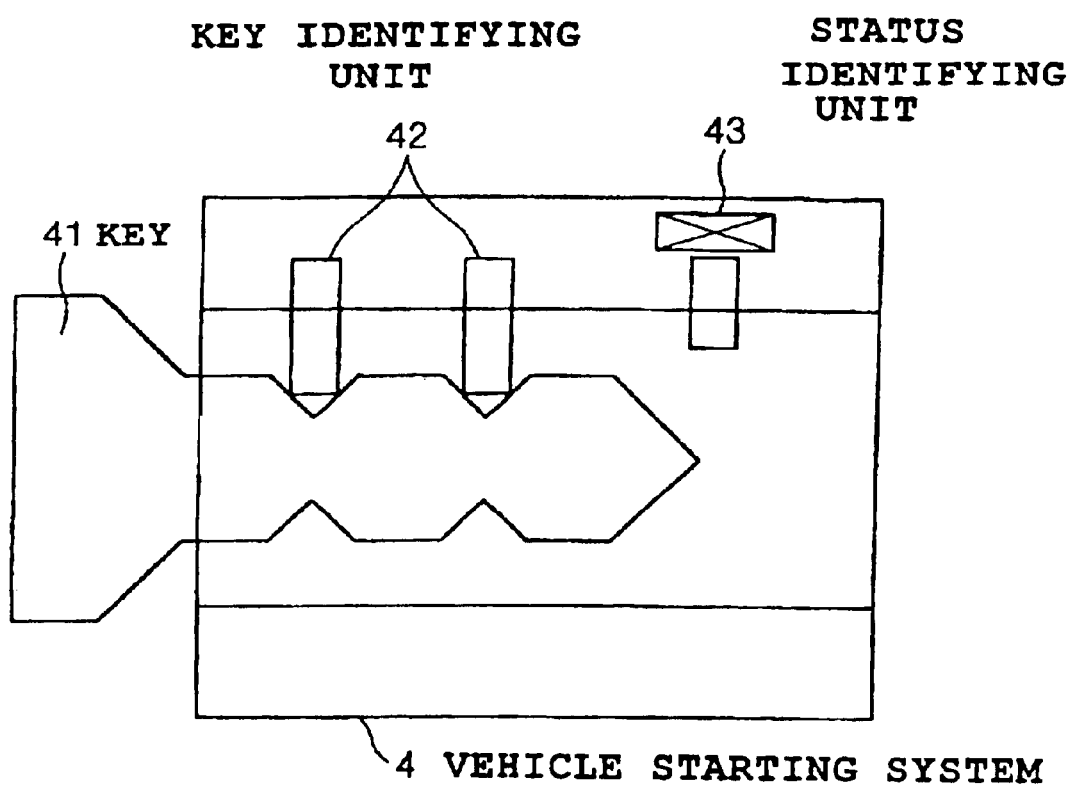
FIG. 3 is a drawing of a mechanism in an arrangement of the emergency communication system of the present invention in a fourteenth embodiment and others.

The emergency communication system of the present invention in a fourteenth embodiment clearly defines the condition of protection to be added to the vehicle starting system 4. FIG. 3 is a drawing to show a mechanism in an embodiment of the emergency communication system of the present invention. In FIG. 3, the vehicle starting system 4 comprises a key 41 capable to operate only a specific vehicle, a key identifying unit 42 with a mechanism to identify the key 41, and a status identifying unit 43 with a mechanism to identify the status that the emergency communication conveying means 2 is connected.

When the key 41 is inserted into the vehicle starting system 4, the key 41 is identified, and if it concurs and is acceptable, a locking mechanism is released so that the key 41 can be turned. Further, when a status information is inputted, indicating that the emergency communication conveying means 2 is connected, the status identifying unit 43 releases the locking mechanism so that the key 41 can be turned using an electromagnet.

(Embodiment 15)

The emergency communication system of the present invention in a fifteenth embodiment turns the insertion of the key 41 to disable status in the protecting condition to be added to the vehicle starting system 4. When a status information indicating that the emergency communication conveying means 2 is connected to the vehicle starting system 4 is not inputted, the insertion of the key 41 is turned to disable status by blocking the inlet of the key 41 with a cover. When a status indicating that the emergency communication conveying means 2 is connected to the vehicle starting system 4, the cover on the inlet of the key 41 is removed by means such as an electromagnet so that the key 41 can be inserted.

(Embodiment 16)

The emergency communication system of the present invention in a sixteenth embodiment turns the shifting of a shift knob from parking range to the other range to disable status in case automatic transmission is adopted in the vehicle under the protecting condition to be added to the vehicle starting system 4. When a status information indicating that the emergency communication conveying means 2 is connected to the vehicle starting system 4 is not inputted, a locking mechanism is operated to block the shifting from parking range to the other range such as driving. By disabling the shifting from the parking range, the starting of the vehicle is turned to disable status. When a status information indicating that the emergency communication conveying means 2 is connected to the vehicle starting system 4 is inputted, the locking mechanism to block the shifting from parking range to the other range such as drive range is released using electromagnet. By enabling the shifting from parking range, the starting of the vehicle is turned to enable status.

(Embodiment 17)

The emergency communication system of the present invention in a seventeenth embodiment turns the shifting from neutral gear position to disable status in case of a vehicle adopting manual transmission under the protecting condition to be added to the vehicle starting system 4. When a status information indicating that the emergency communication conveying means 2 is connected to the vehicle starting system 4 is not inputted, a locking mechanism to block the shifting from neural gear position to the other gear position such as low gear is operated. By disabling the shifting from neutral gear position, the starting of the vehicle is turned to disable status. When a status information indicating that the emergency communication conveying means 2 is connected to the vehicle starting system 4 is inputted, the locking mechanism to block the shifting from neutral gear position to the other gear position such as low gear is released using electromagnet. By enabling the shifting from neutral gear position, the starting of the vehicle is turned to enable status.

(Embodiment 18)

The emergency communication system of the present invention in an eighteenth embodiment turns the release of parking brake to disable status under the protecting condition to be added to the vehicle starting system 4. When a status information indicating that the emergency communication conveying means 2 is connected to the vehicle starting system 4 is not inputted, a locking mechanism to block the release of the parking brake is operated. By disabling the release of the parking brake, the starting of the vehicle is turned to disable status. When a status information indicating that the emergency communication conveying means 2 is connected to the vehicle starting system 4, the locking mechanism to block the release of the parking gear is released using electromagnet. By enabling the release of parking brake, the starting of the vehicle is turned to enable status.

(Embodiment 19)

Figure 4:
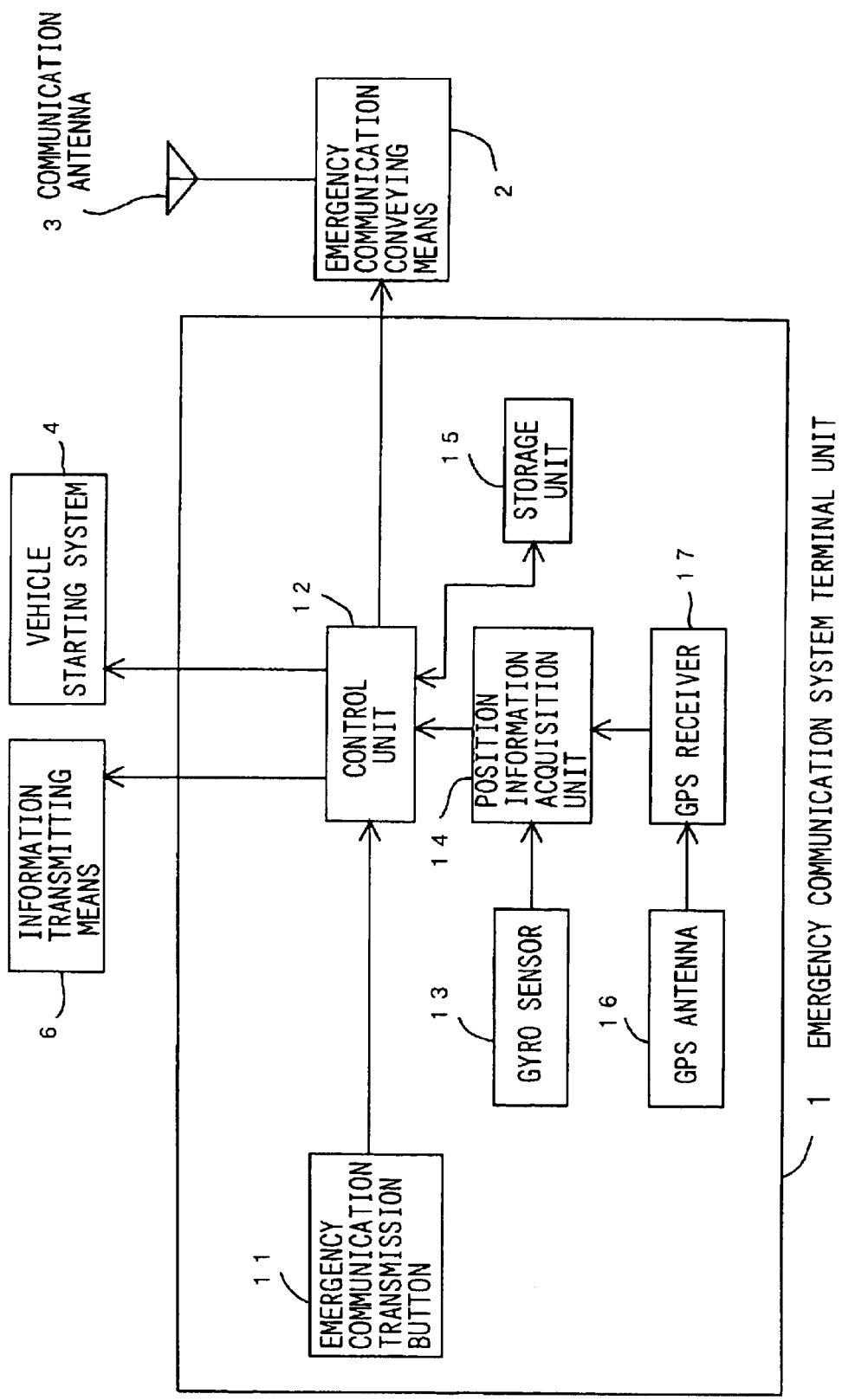
FIG. 4 is a block diagram of an arrangement of the emergency communication system of the present invention in a nineteenth embodiment and others.

FIG. 4 is a block diagram of an arrangement of the emergency communication system in a nineteenth embodiment of the present invention. In FIG. 4, the emergency communication system comprises an emergency communication system terminal unit 1, emergency communication conveying means 2 such as handy phone, a communication antenna 3, a vehicle starting system 4, and information transmitting means 6 for transmitting information to the user such as buzzer, LED, etc., indicating that the emergency communication conveying means 2 is not connected to an equipment having an interface such as the emergency communication system terminal unit 1, to which the emergency communication conveying means 2 is connected.

When normal operation of the emergency communication conveying means 2 used in radio communication is confirmed, and it is found that the emergency communication conveying means 2 is not connected in normal manner, a status information is outputted, indicating that the emergency communication conveying means 2 is not connected by the emergency communication system terminal unit 1. According to the status information, when the data indicating that the emergency communication conveying means 2 is not connected is received, the information transmitting means 6 transmits that the emergency communication conveying means 2 is not connected by the means such as buzzer, LED, etc. for transmitting information to the user (Embodiment 20)

Description will be given now on the emergency communication system of the present invention in a twentieth embodiment. Under the condition that power is connected for engine starting, normal operation of the emergency communication conveying means 2 is confirmed using radio communication to be used in the emergency communication system. When the emergency communication conveying means 2 is not connected normally, a status information indicating that the emergency communication conveying means 2 is not connected by the emergency communication system terminal unit 1. When a data is received according to the status information, indicating that the emergency communication conveying means 2 is not connected, the information transmitting means 6 transmits by means such as buzzer, LED, etc. for transmitting information to the user that it is not connected under the condition that power is connected for engine starting.

(Embodiment 21)

The emergency communication system of the present invention in a twenty-first embodiment is achieved using an element with illuminating functions such as lamp, LED, etc., which constitutes and serves as the information transmitting means 6. The information transmitting means 6 uses an element with illuminating functions such as indicator as the means for transmitting information to the user. When the emergency communication conveying means 2 is not connected normally, based on the status information that the conveying means 2 is not connected, the information transmitting means 6 transmits that the emergency communication conveying means 2 is not connected using illumination light.

(Embodiment 22)

The emergency communication system of the present invention in a twenty-second embodiment is achieved using an element with illuminating functions such as lamp, LED, etc., which constitutes and serves as the information transmitting means 6. The information transmitting means 6 uses an element with illuminating functions such as indicator as the means for transmitting information to the user. When the emergency communication conveying means 2 is normally connected, based on the status information that the communication conveying means 2 is not connected, the information transmitting means 6 transmits that the emergency communication conveying means 2 is not connected using flashing illumination.

(Embodiment 23)

Figure 5:
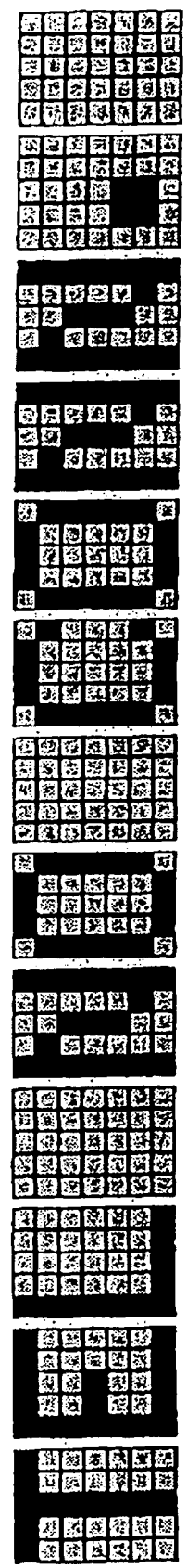
FIG. 5 is a schematical drawing showing an example of display in the emergency communication system of the present invention in a twenty-third embodiment and others.

The emergency communication system of the present invention in a twenty-third embodiment is achieved using an element with display functions such as LCD, which constitutes and serves as the information transmitting means 6. The information transmitting means 6 uses an element with display functions such as LCD as the means for transmitting information to the user. When the emergency communication conveying means 2 is not connected normally, based on the status information that the emergency communication conveying means 2 is not connected, the information transmitting means 6 transmits that the emergency communication conveying means 2 is not connected using character display. An example of display is shown in FIG. 5.

(Embodiment 24)

The emergency communication system of the present invention in a twenty-fourth embodiment is achieved by providing an element with illuminating functions such as lamp, LED, etc. serving as the information transmitting means 6 mounted on a dashboard where instruments such as speedometer are arranged. The information transmitting means 6 uses an element with illuminating functions such as indicator as the means for transmitting information to the user. When the emergency communication conveying means 2 is not connected normally, based on the status information indicating that the communication conveying means 2 is not connected, the information transmitting means 6 on the dashboard transmits the information that the emergency communication conveying means 2 is not connected by means of flashing illumination.

(Embodiment 25)

The emergency communication system of the present invention in a twenty-fifth embodiment is achieved by providing an element with display functions such as LCD, serving as the information transmitting means 6 mounted on a dashboard where instruments such as speedometer are arranged. The information transmitting means 6 uses an element with display functions such as LCD as the means for transmitting information to the user. When the emergency communication conveying means 2 is not connected normally, based on the status information indicating that the emergency communication conveying means 2 is not connected, the information transmitting means 6 mounted on the dashboard transmits using character display that the emergency communication conveying means 2 is not connected.

(Embodiment 26)

The emergency communication system of the present invention in a twenty-sixty embodiment is achieved using an element such as LSI with functions to generate and output voice, which serves as the information transmitting means 6. The information transmitting means 6 uses an element to generate voice synthetic sound as the means for transmitting information to the user. When the emergency communication conveying means 2 is not connected normally, based on the status information indicating that the emergency communication conveying means 2 not connected, the information transmitting means 6 transmits using means such as voice that the emergency communication conveying means 2 is not connected.

(Embodiment 27)

The emergency communication system of the present invention in a twenty-seventy embodiment is achieved using an element such as buzzer to generate and output voice in a single frequency or in a plurality of frequencies such as beep, which serves as the information transmitting means 6. The information transmitting means 6 uses an element to generate voice synthetic sound as the means for transmitting information to the user. When the emergency communication conveying means 2 is not connected normally, based on the status information that the emergency communication conveying means 2 is not connected, the information transmitting means 6 transmits using means such as beep that the emergency communication conveying means 2 is not connected.

(Embodiment 28)

Description will be given now on the emergency communication system of the present invention in a twenty-eighth embodiment referring to FIG. 1. In FIG. 1, normal operation of the emergency communication conveying means 2 using radio communication in the emergency communication system is confirmed. When the emergency communication conveying means 2 is not connected normally, the control unit 12 in the emergency communication system terminal unit 1 outputs the data, indicating that the emergency communication conveying means 2 is not connected, to the storage unit 15 in the emergency communication system terminal unit 1. Based on the data that the emergency communication conveying means 2 is not connected, the storage unit 15 records on a storage element such as memory that the emergency communication conveying means 2 is not connected.

(Embodiment 29)

Description will be given now on the emergency communication system in a twenty-ninth embodiment referring to FIG. 4. In FIG. 4, normal operation of the emergency communication conveying means 2 using radio communication device adopted in the emergency communication system is confirmed. When the emergency communication conveying means 2 is not connected normally, the status information indicating that the emergency communication conveying means 2 is not connected is outputted by the emergency communication system terminal unit 1. When the data is received, indicating that the emergency communication conveying means 2 is not connected, the information transmitting means 6 transmits that the conveying means 2 is not connected by the means such as buzzer, LED, etc. for transmitting information to the user based on the status information indicating that it is not connected.

Further, the control unit 12 in the emergency communication system terminal unit 1 outputs the data, indicating that information has been transmitted to the user because the emergency communication conveying means 2 is not connected. These data are outputted to the storage unit 15 in the emergency communication system terminal unit 1. Based on the data indicating that the information has been transmitted to the user because the emergency communication conveying means 2 is not connected, the storage unit 15 records on a storage element such as memory that the information has been transmitted to the user because the emergency communication conveying means 2 is not connected.

(Embodiment 30)

Figure 6:
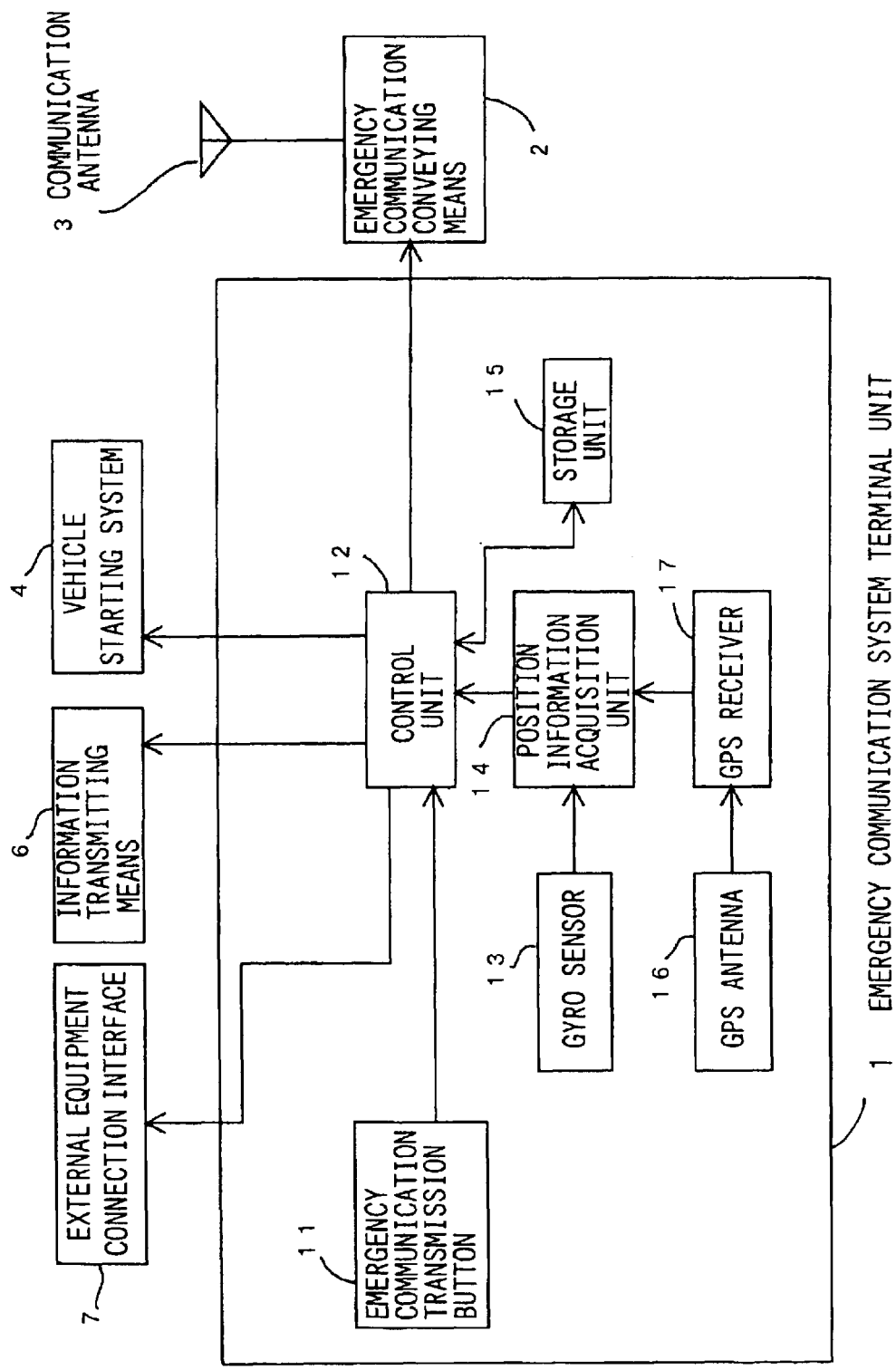
FIG. 6 is a block diagram of an arrangement of the emergency communication system of the present invention in a thirtieth embodiment and others.

FIG. 6 is a block diagram showing an arrangement of the emergency communication system of the present invention in a thirtieth embodiment. In FIG. 6, the thirtieth embodiment is used to output the data indicating that the emergency communication conveying means 2 is not connected or that information has been transmitted to the user because the emergency communication conveying means 2 is not connected. The data are outputted to an externally connected equipment to be connected to the emergency communication system terminal unit 1 using an external interface (not shown). This is used for the purpose of identifying operation status of the emergency communication system terminal unit 1 based on the data such as history of maintenance or operational failure.

Next, description will be given on operation of the thirtieth embodiment. In FIG. 6, the emergency communication system comprises an emergency communication system terminal unit 1, emergency communication conveying means 2 such as handy phone, a communication antenna 3, a vehicle starting system 4, information transmitting means 6, and an external equipment connection interface 7 for outputting the data, indicating that the emergency communication conveying means 2 is not connected or that information has been transmitted to the user because the emergency communication conveying means 2 is not connected. These data are outputted to an externally connected equipment connected to the emergency communication system terminal unit 1.

Normal operation of the emergency communication conveying means 2 using radio communication device adopted in the emergency communication system is confirmed. When the emergency communication conveying means 2 is not connected normally, the control unit 12 in the emergency communication system terminal unit 1 outputs the data indicating that the emergency communication conveying means 2 is not connected or that information has been transmitted to the user because the emergency communication conveying means 2 is not connected. These data are outputted to the storage unit in the emergency communication system terminal unit 1. Based on the data indicating that the emergency communication conveying means 2 is not connected, the storage unit 15 records on a storage element such as memory that the emergency communication conveying means 2 is not connected or that information has been transmitted to the user because the conveying means 2 is not connected.

Further, the external equipment connection interface 7 inputs a request of history data from the externally connected equipment. Based on the request signal of history data inputted through the external equipment connection interface 7, the control unit 12 instructs to output the corresponding history data to the storage unit 15. In response to the data request from the control unit 12, the storage unit 15 outputs the history data stored on the storage element such as memory to the control unit 12. The control unit 12 outputs the data from the storage unit 15 via the external equipment connection interface 7 using the same format signal as the externally connected equipment.

(Embodiment 31)

The emergency communication system of the present invention in a thirty-first embodiment is achieved using non-synchronizing serial signal, which makes it possible to transmit signal only with data signal. It defines signal format of the interface 7 of the externally connected equipment and the emergency communication system terminal unit 1. The data indicating that the emergency communication conveying means 2 is not connected or that information has been transmitted to the user because the emergency communication conveying means 2 is not connected are outputted to an external equipment connected to the emergency communication system terminal unit 1 using an external interface (not shown). The emergency communication system terminal unit 1 outputs the data indicating that the emergency communication conveying means 2 is not connected or that information has been transmitted to user because the emergency communication conveying means 2 is not connected. These data are outputted using non-synchronizing serial signal to an external equipment connected to the external equipment connection interface 7.

(Embodiment 32)

The emergency communication system of the present invention in a thirty-second embodiment is achieved using a serial signal synchronized with clock signal, frame signal, etc., which makes it possible to transmit signal only with data signal. It defines signal format of the interface 7 of the externally connected equipment and the emergency communication system terminal unit 1. The data indicating that the emergency communication conveying means 2 is not connected or that information has been transmitted to the user because the emergency communication conveying means 2 is not connected are outputted to an external equipment connected to the emergency communication system terminal unit 1 using an external interface (not shown). When the emergency communication system terminal unit 1 outputs the data indicating that the emergency communication conveying means 2 is not connected or that information has been transmitted to user because the emergency communication conveying means 2 is not connected, these data are outputted using synchronizing serial signal to an external equipment connected to the external equipment connection interface 7.

(Embodiment 33)

The emergency communication system of the present invention in a thirty-third embodiment is achieved using a bus communication signal for transmitting and receiving the data with parallel signal. It defines signal format of the interface 7 of the externally connected equipment and the emergency communication system terminal unit 1. The data indicating that the emergency communication conveying means 2 is not connected or that information has been transmitted to the user because the emergency communication conveying means 2 is not connected are outputted to an external equipment connected to the emergency communication system terminal unit 1 using an external interface (not shown). When the emergency communication system terminal unit 1 outputs the data indicating that the emergency communication conveying means 2 is not connected or that information has been transmitted to user because the emergency communication conveying means 2 is not connected, these data are outputted using the bus communication signal to an external equipment connected to the external equipment connection interface 7.

(Embodiment 34)

The emergency communication system of the present invention in a thirty-fourth embodiment is achieved using a LAN signal such as IE-BUS system, ARCNET system, etc. to achieve communication by means of a plurality of connection devices. It defines signal format of the interface 7 of the externally connected equipment and the emergency communication system terminal unit 1. The data indicating that the emergency communication conveying means 2 is not connected or that information has been transmitted to the user because the emergency communication conveying means 2 is not connected are outputted to an external equipment connected to the emergency communication system terminal unit 1 using an external interface (not shown). When the emergency communication system terminal unit 1 outputs the data indicating that the emergency communication conveying means 2 is not connected or that information has been transmitted to user because the emergency communication conveying means 2 is not connected, these data are outputted using the LAN signal to an external equipment connected to the external equipment connection interface 7.

(Embodiment 35)

The emergency communication system of the present invention in a thirty-fifth embodiment is achieved using an infrared signal for transmitting and receiving the data requiring no wired connection. It defines signal format of the interface 7 of the externally connected equipment and the emergency communication system terminal unit 1. The data indicating that the emergency communication conveying means 2 is not connected or that information has been transmitted to the user because the emergency communication conveying means 2 is not connected are outputted to an external equipment connected to the emergency communication system terminal unit 1 using an external interface (not shown). When the emergency communication system terminal unit 1 outputs the data indicating that the emergency communication conveying means 2 is not connected or that information has been transmitted to user because the emergency communication conveying means 2 is not connected, these data are outputted using the infrared signal to an external equipment connected to the external equipment connection interface 7.

(Embodiment 36)

The emergency communication system of the present invention in a thirty-sixth embodiment is achieved using a radio signal based on electric waves. It defines signal format of the interface 7 of the externally connected equipment and the emergency communication system terminal unit 1. The data indicating that the emergency communication conveying means 2 is not connected or that information has been transmitted to the user because the emergency communication conveying means 2 is not connected are outputted to an external equipment connected to the emergency communication system terminal unit 1 using an external interface (not shown). When the emergency communication system terminal unit 1 outputs the data indicating that the emergency communication conveying means 2 is not connected or that information has been transmitted to user because the emergency communication conveying means 2 is not connected, these data are outputted using the radio signal to an external equipment connected to the external equipment connection interface 7.

(Embodiment 37)

Description will be given now on the emergency communication system of the present invention in a thirty-seventh embodiment referring to FIG. 4. In FIG. 4, an equipment such as the emergency communication system terminal unit 1, to which the emergency communication conveying means 2 can be connected, confirms that the emergency communication conveying means 2 is operating normally. When it cannot be confirmed that the emergency communication conveying means 2 is connected normally from the reason such as failure, a status information indicating that the emergency communication conveying means 2 is not connected is outputted by the emergency communication system terminal unit 1. When it cannot be confirmed from the reason such as failure that the emergency communication conveying means 2 is not connected normally according to the status information, the information transmitting means 6 transmits that it is not possible to confirm the normal connection from the reason such as failure by the means for transmitting the information to the user, using buzzer, LED, etc.

(Embodiment 38)

Description will be given now on the emergency communication system of the present invention in a thirty-eighth embodiment referring to FIG. 4. In FIG. 4, an equipment such as the emergency communication system terminal unit 1, to which the emergency communication conveying means 2 can be connected, confirms that the emergency communication conveying means 2 is operating normally under the condition that power is connected for engine starting. When it cannot be confirmed that the emergency communication conveying means 2 is connected normally from the reason such as failure, a status information indicating that the emergency communication conveying means 2 is not connected is outputted by the emergency communication system terminal unit 1. When it cannot be confirmed from the reason such as failure that the emergency communication conveying means 2 is not connected normally according to the status information, under the condition that power is connected for engine starting, the information transmitting means 6 transmits that it is not possible to confirm the normal connection due to the reason such as failure by the means for transmitting the information to the user, using buzzer, LED, etc.

(Embodiment 39)

The emergency communication system of the present invention in a thirty-ninth embodiment is achieved using an element with illuminating functions such as lamp, LED, etc. which serves as the information transmitting means 6. The information transmitting means 6 uses an element with illuminating functions such as indicator as the means for transmitting information to the user. When it is not possible to confirm that the emergency communication conveying means 2 is connected normally from the reason such as failure, based on the status information that it is not possible to confirm that the emergency communication conveying means 2 is connected normally from the reason such as failure, the information transmitting means 6 transmits using illumination light that the emergency communication conveying means 2 is not connected.

(Embodiment 40)

The emergency communication system of the present invention in a fortieth embodiment is achieved using an element with illuminating functions such as lamp, LED, etc. which serves as the information transmitting means 6. The information transmitting means 6 uses an element with illuminating functions such as indicator as the means for transmitting information to the user. When it is not possible to confirm that the emergency communication conveying means 2 is connected normally from the reason such as failure, based on the status information that it is not possible to confirm that the emergency communication conveying means 2 is connected normally from the reason such as failure, the information transmitting means 6 transmits using flashing illumination that the emergency communication conveying means 2 is not connected.

(Embodiment 41)

The emergency communication system of the present invention in a forty-first embodiment is achieved using an element with display functions such as LCD which serves as the information transmitting means 6. The information transmitting means 6 uses an element with illuminating functions such as indicator as the means for transmitting information to the user. When it is not possible to confirm that the emergency communication conveying means 2 is connected normally from the reason such as failure, based on the status information that it is not possible to confirm that the emergency communication conveying means 2 is connected normally from the reason such as failure, the information transmitting means 6 transmits using character display that the emergency communication conveying means 2 is not connected.

(Embodiment 42)

The emergency communication system of the present invention in a forty-second embodiment is achieved by providing illuminating functions such as LED on a dashboard where instruments such as speedometer are arranged. As the information transmitting means 6, an element with illuminating functions such as indicator is used as the means for transmitting information to the user. When it is not possible to confirm that the emergency communication conveying means 2 is connected normally from the reason such as failure, based on the status information indicating that it is not possible to confirm the normal connection of the emergency communication conveying means 2, the information transmitting means 6 on the dashboard transmits using flashing illumination that the emergency communication conveying means 2 is not connected.

(Embodiment 43)

The emergency communication system of the present invention in a forty-third embodiment is achieved by providing display functions such as LCD on a dashboard where instruments such as speedometer are arranged. As the information transmitting means 6, an element with display functions such as LCD is used as the means for transmitting information to the user. When it is not possible to confirm that the emergency communication conveying means 2 is connected normally from the reason such as failure, based on the status information indicating that it is not possible to confirm the normal connection of the emergency communication conveying means 2, the information transmitting means 6 on the dashboard transmits using character display that the emergency communication conveying means 2 is not connected.

(Embodiment 44)

The emergency communication system of the present invention in a forty-fourth embodiment is achieved using an element such as LSI for generating and outputting voice such as synthetic voice, which serves as the information transmitting means 6. As the information transmitting means 6, an element for generating voice synthetic sound is used as the means for transmitting information to the user. When it is not possible to confirm normal connection of the emergency communication conveying means 2 from the reason such as failure, based on the status information indicating that the emergency communication conveying means 2 is not connected, the information transmitting means 6 transmits that it is not possible to confirm normal connection of the emergency communication conveying means 2 from the reason such as failure using the means such as voice.

(Embodiment 45)

The emergency communication system of the present invention in a forty-fifth embodiment is achieved using an element such as buzzer for generating and outputting voice in a single frequency or in a plurality of frequencies such as beep, which serves as the information transmitting means 6. As the information transmitting means 6, an element to generate voice synthetic sound is used as the means for transmitting information to the user. When it is not possible to confirm normal connection of the emergency communication conveying means 2 from the reason such as failure, based on the status information indicating that the emergency communication conveying means 2 is not connected, the information transmitting means 6 transmits that it is not possible to confirm normal connection of the emergency communication conveying means 2 from the reason such as failure using the means such as beep.

(Embodiment 46)

Description will be given now on the emergency communication system of the present invention in a forty-sixth embodiment referring to FIG. 1. In FIG. 1, an equipment such as the emergency communication system terminal unit 1, to which the emergency communication conveying means 2 can be connected, confirms normal operation of the emergency communication conveying means 2 using radio communication device adopted in the emergency communication system. When it is not possible to confirm normal connection of the emergency communication conveying means 2 from the reason such as failure, the control unit 12 in the emergency communication system terminal unit 1 outputs the data indicating that it is not possible to confirm normal connection of the emergency communication conveying means 2 from the reason such as failure. This data is outputted to the storage unit 15 in the emergency communication system terminal unit 1. From the data indicating that it is not possible to confirm normal connection of the emergency communication conveying means 2 from the reason such as failure, the storage unit 15 records on a storage element such as memory that it is not possible to confirm normal connection of the emergency communication conveying means 2 from the reason such as failure.

(Embodiment 47)

Description will be given now on the emergency communication system of the present invention in a forty-seventh embodiment. In FIG. 4, an equipment such as the emergency communication system terminal unit, to which the emergency communication conveying means 2 can be connected, confirms normal operation of the emergency communication conveying means 2 using radio communication device adopted in the emergency communication system. When it is not possible to confirm that normal connection of the emergency communication conveying means 2 from the reason such as failure, a status information is outputted from the emergency communication system terminal unit 1, indicating that it is not possible to confirm normal connection of the emergency communication conveying means 2 from the reason such as failure. When the data is received, indicating that it is not possible to confirm normal connection of the emergency communication conveying means 2 from the reason such as failure, the information transmitting means 6 transmits that it is not possible to confirm normal connection of the emergency communication conveying means 2 from the reason such as failure by the means for transmitting information to the user such as buzzer, LED, etc. based on the status information.

Further, the control unit 12 in the emergency communication system terminal unit 1 outputs the data, indicating that information has been transmitted to the user because it was not possible to confirm normal connection of the emergency communication conveying means 2 from the reason such as failure. These data are outputted to the storage unit 15 in the emergency communication system terminal unit 1. Based on the data indicating that information has been transmitted to the user because it was not possible to confirm normal connection of the emergency communication conveying means 2 from the reason such as failure, the storage unit 15 records on a storage element such as memory that information has been transmitted to the user because it was not possible to confirm normal connection of the emergency communication conveying means 2 from the reason such as failure.

(Embodiment 48)

Description will be given now on the emergency communication system of the present invention in a forty-eighth embodiment referring to Fit. 6. In FIG. 6, the forty-eighth embodiment is used to output the data indicating that it is not possible to confirm normal connection of the emergency communication conveying means 2 from the reason such as failure or that information has been transmitted to the user because it was not possible to confirm normal connection of the emergency communication conveying means from the reason such as failure. These data are outputted to an external equipment connected to the emergency communication system terminal unit 1 using an external interface (not shown). It is used for the purpose of identifying operation status of the emergency communication system terminal unit 1 based on the data such as history of maintenance or failure.

Next, description will be given on operation of a forty-eighth embodiment. In FIG. 6, an equipment such as the emergency communication system terminal unit 1, to which the emergency communication conveying means 2 can be connected, confirms normal operation of the emergency communication conveying means 2 using radio communication device adopted in the emergency communication system. When it is not possible to confirm normal connection of the emergency communication conveying means 2 from the reason such as failure or when information has been transmitted to the user because it was not possible to confirm normal connection of the emergency communication conveying means 2 from the reason such as failure, the control unit 12 in the emergency communication system terminal unit 1 outputs the data indicating that it is not possible to confirm normal connection of the emergency communication conveying means 2 from the reason such as failure or that information has been transmitted to the user because it was not possible to confirm normal connection from the reason such as failure. The storage unit 15 records the data indicating that it is not possible to confirm normal connection of the emergency communication conveying means 2 from the reason such as failure or that information has been transmitted to the user because it was not possible to confirm normal connection from the reason such as failure.

Further, the external equipment connection interface 7 inputs a request of history data from an externally connected equipment. Based on the request signal of history data inputted via the external equipment connection interface 7, the control unit 12 instructs to output the corresponding history data to the storage unit 15. In response to the data request from the control unit 12, the storage unit 15 outputs the history data stored in the storage element such as memory to the control unit 12. The control unit 12 outputs the data from the storage unit 15 via the external equipment connection interface 7 using a predetermined same format signal as the externally connected equipment.

(Embodiment 49)

The emergency communication system of the present invention in a forty-ninth embodiment is achieved using a non-synchronizing serial signal which can be transmitted only with data signal, and it defines signal format of the emergency communication system terminal unit 1 and the external equipment connection interface when the data (indicating that it is not possible to confirm normal connection of the emergency communication conveying means 2 from the reason such as failure or that information has been transmitted to the user because it was not possible to confirm normal connection from the reason such as failure is outputted) to an external equipment to be connected to the emergency communication system terminal unit 1 using an external interface (not shown). The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to the external equipment connected to the external equipment connection interface 7 via an external equipment connection interface 7 using the non-synchronizing serial signal.

(Embodiment 50)

The emergency communication system of the present invention in a fiftieth embodiment is achieved using a serial signal synchronized with clock signal, frame signal, etc., and it defines signal format of the emergency communication system terminal unit 1 and the external equipment connection interface when the data (indicating that it is not possible to confirm normal connection of the emergency communication conveying means 2 from the reason such as failure or that information has been transmitted to the user because it was not possible to confirm normal connection from the reason such as failure) is outputted to an external equipment to be connected to the emergency communication system terminal unit 1 using an external interface (not shown). The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to the external equipment connected to the external equipment connection interface 7 via an external equipment connection interface 7 using the synchronizing serial signal.

(Embodiment 51)

The emergency communication system of the present invention in a fifty-first embodiment is achieved using a bus communication signal for transmitting and receiving the data by parallel signal, and it defines signal format of the emergency communication system terminal unit 1 and the external equipment connection interface when the data (indicating that it is not possible to confirm normal connection of the emergency communication conveying means 2 from the reason such as failure or that information has been transmitted to the user because it was not possible to confirm normal connection from the reason such as failure) is outputted to an external equipment to be connected to the emergency communication system terminal unit 1 using an external interface (not shown). The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to the external equipment connected to the external equipment connection interface 7 via an external equipment connection interface 7 using the bus communication signal.

(Embodiment 52)

The emergency communication system of the present invention in a fifty-second embodiment is achieved using a LAN signal of IE-BUS system, ARCNET system, etc. for achieving communication using a plurality of connection devices, and it defines signal format of the emergency communication system terminal unit 1 and the external equipment connection interface when the data (indicating that it is not possible to confirm normal connection of the emergency communication conveying means 2 from the reason such as failure or that information has been transmitted to the user because it was not possible to confirm normal connection from the reason such as failure) is outputted to an external equipment to be connected to the emergency communication system terminal unit 1 using an external interface (not shown). The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to the external equipment connected to the external equipment connection interface 7 via an external equipment connection interface 7 using the LAN signal.

(Embodiment 53)

The emergency communication system of the present invention in a fifty-third embodiment is achieved using an infrared signal for transmitting and receiving the data requiring no wired connection, and it defines signal format of the emergency communication system terminal unit 1 and the external equipment connection interface when the data (indicating that it is not possible to confirm normal connection of the emergency communication conveying means 2 from the reason such as failure or that information has been transmitted to the user because it was not possible to confirm normal connection from the reason such as failure) is outputted to an external equipment to be connected to the emergency communication system terminal unit 1 using an external interface (not shown). The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to the external equipment connected to the external equipment connection interface 7 via an external equipment connection interface 7 using the infrared signal.

(Embodiment 54)

The emergency communication system of the present invention in a fifty-fourth embodiment is achieved using a radio signal on electric waves for transmitting and receiving the data without requiring wired connection, and it defines signal format of the emergency communication system terminal unit 1 and the external equipment connection interface when the data (indicating that it is not possible to confirm normal connection of the emergency communication conveying means 2 from the reason such as failure or that information has been transmitted to the user because it was not possible to confirm normal connection from the reason such as failure) is outputted to an external equipment to be connected to the emergency communication system terminal unit 1 using an external interface (not shown) without requiring wired connection. The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to the external equipment connected to the external equipment connection interface 7 via an external equipment connection interface 7 using the radio signal.

(Embodiment 55)

Description will be given on the emergency communication system in a fifty-fifth embodiment referring to FIG. 1. In FIG. 1, the vehicle starting system 4 receives a status information from the control unit 12, indicating that the emergency communication conveying means 2 is connected to the emergency communication system terminal unit 1. When the emergency communication conveying means 2 is not connected according to the status information, the starting operation of the vehicle such as engine starting is turned to disable status. When the emergency communication conveying means 2 is connected according to the status information, the starting operation of the vehicle such as engine starting is turned to enable status. As a result, the emergency communication conveying means 2 can be used instead of a key for operating the vehicle, and the vehicle can be started only by the emergency communication conveying means 2 without using the key.

(Embodiment 56)

Description will be given on the emergency communication system of the present invention in a fifty-sixth embodiment referring to FIG. 4. In FIG. 4, an equipment such as the emergency communication system terminal unit 1, to which the emergency communication conveying means 2 is connected, confirms normal operation of the emergency communication conveying means 2. When, normal connection of the emergency communication conveying means 2 cannot be confirmed, e.g. when it is removed or detached, a status information is outputted from the emergency communication system terminal unit 1, indicating that the emergency communication conveying means 2 is not connected. When the data indicating that the emergency communication conveying means 2 is not connected normally, e.g. when it is removed or detached, according to the status information, the information transmitting means 6 transmits that the emergency communication conveying means 2 is not connected by the means such as buzzer, LED, etc. for transmitting information to the user.

(Embodiment 57)

Description will be given below on the emergency communication system of the present invention in a fifty-seventh embodiment referring to FIG. 4. In FIG. 4, under the condition that power is connected for engine starting, an equipment such as the emergency communication system terminal unit 1, to which the emergency communication conveying means 2 can be connected, confirms normal operation of the conveying means 2. When, it is not possible to confirm normal connection from the reason such as removal of the conveying means, a data is outputted from the emergency communication system terminal unit 1, indicating that it is not possible to confirm normal connection because the emergency communication conveying means 2 is removed. When a data is received indicating that it is not possible to confirm normal connection because the emergency communication conveying means 2 is removed according to the status information, the information transmitting means 6 transmits the information, indicating that the emergency communication conveying means 2 is not connected, by the means such as buzzer, LED, etc. for transmitting the information to the user, i.e. the information that it is not connected normally because it is removed under the condition that power is connected for engine starting.

(Embodiment 58)

The emergency communication system of the present invention in a fifty-eight embodiment is achieved using an element with illuminating function such as lamp, LED, etc. which serves as the information transmitting means 6. The information transmitting means 6 uses an element with illuminating function such as indicator as the means for transmitting information to the user. When it is not possible to confirm normal connection from the reason such as removal or detachment of the emergency communication conveying means 2 according to the status information, indicating that it is not possible to confirm normal connection from the reason such as removal of the emergency communication conveying means 2, the information transmitting means 6 transmits that the emergency communication conveying means 2 is not connected normally using illumination light.

(Embodiment 59)

The emergency communication system of the present invention in a fifty-ninth embodiment is achieved using an element with illuminating function such as lamp, LED, etc. which serves as the information transmitting means 6. The information transmitting means 6 uses an element with illuminating function such as indicator as the means for transmitting information to the user. When it is not possible to confirm normal connection from the reason such as removal or detachment of the emergency communication conveying means 2 according to the status information, indicating that it is not possible to confirm normal connection from the reason such as removal of the emergency communication conveying means 2, the information transmitting means 6 transmits that the emergency communication conveying means 2 is not connected normally using flashing illumination.

(Embodiment 60)

Figure 7:
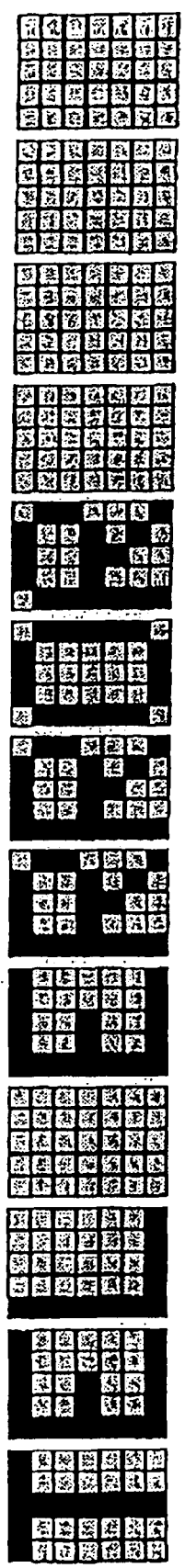
FIG. 7 is a schematical drawing showing an example of display in the emergency communication system of the present invention in a forty-first embodiment and others.

The emergency communication system of the present invention in a sixtieth embodiment is achieved using an element with display functions such as LCD which serves as the information transmitting means 6. The information transmitting means 6 uses an element with display functions such as LCD as the means for transmitting information to the user. When it is not possible to confirm normal connection from the reason such as removal or detachment of the emergency communication conveying means 2 according to the status information, indicating that it is not possible to confirm normal connection from the reason such as removal of the emergency communication conveying means 2, the information transmitting means 6 transmits that the emergency communication conveying means 2 is not connected normally using character display. An example of display is shown in FIG. 7.

(Embodiment 61)

The emergency communication system of the present invention in a sixty-first embodiment is achieved by providing an element with illuminating functions such as lamp, LED, etc., serving as the information transmitting means 6, on a dashboard where instruments such as speedometer are arranged. The information transmitting means 6 uses an element with illuminating functions such as indicator as the means for transmitting information to the user. When it is not possible to confirm normal connection from the reason such as removal of the emergency communication conveying means 2, according to status information indicating that it is not possible to confirm normal connection from the reason such as removal of the emergency communication conveying means 2, the information transmitting means 6 on the dashboard transmits that the emergency communication conveying means 2 is not connected using flashing illumination.

(Embodiment 62)

The emergency communication system of the present invention in a sixty-second embodiment is achieved by providing an element with display functions such as LCD, serving as the information transmitting means 6, on a dashboard where instruments such as speedometer are arranged. The information transmitting means 6 uses an element with display functions such as LCD as the means for transmitting information to the user. When it is not possible to confirm normal connection from the reason such as removal of the emergency communication conveying means 2, according to status information indicating that it is not possible to confirm normal connection from the reason such as removal of the emergency communication conveying means 2, the information transmitting means 6 on the dashboard transmits that the emergency communication conveying means 2 is not connected using character display.

(Embodiment 63)

The emergency communication system of the present invention in a sixty-third embodiment is achieved using an element such as buzzer for generating and outputting voice in a single frequency or in a plurality of frequencies such as beep which serves as the information transmitting means 6. The information transmitting means 6 uses an element for generating voice synthetic sound as the means for transmitting information to the user. When it is not possible to confirm normal connection from the reason such as removal or detachment of the emergency communication conveying means 2 according to the status information, indicating that it is not possible to confirm normal connection from the reason such as removal of the emergency communication conveying means 2, the information transmitting means 6 transmits that the emergency communication conveying means 2 is not connected normally using means such as beep.

(Embodiment 64)

The emergency communication system of the present invention in a sixty-fourth embodiment is achieved using an element such as LSI for generating and outputting voice such as voice synthetic sound which serves as the information transmitting means 6. The information transmitting means 6 uses an element for generating voice synthetic sound as the means for transmitting information to the user. When it is not possible to confirm normal connection from the reason such as removal or detachment of the emergency communication conveying means 2 according to the status information, indicating that it is not possible to confirm normal connection from the reason such as removal of the emergency communication conveying means 2, the information transmitting means 6 transmits that the emergency communication conveying means 2 is not connected normally using means such as voice.

(Embodiment 65)

Description will be given below on the emergency communication system of the present invention in a sixty-fifth embodiment referring to FIG. 4. In FIG. 4, an equipment such as the emergency communication system terminal unit 1, to which the emergency communication conveying means 2 can be connected, confirms normal operation of the emergency communication conveying means 2 using radio communication device adopted in the emergency communication system. When it is not possible to confirm normal connection from the reason such as removal of the emergency communication conveying means 2, the control unit 12 in the emergency communication system terminal unit 1 outputs the data, indicating that it is not possible to confirm normal connection from the reason such as removal of the conveying means 2. The data is outputted to the storage unit 15 in the emergency communication system terminal unit 1. Based on the data indicating that it is not possible to confirm normal connection from the reason such as removal of the emergency communication conveying means 2, the storage unit 15 records on a storage element such as memory that it is not possible to confirm normal connection from the reason such as removal of the emergency communication conveying means 2.

(Embodiment 66)

Description will be given below on the emergency communication system of the present invention in a sixty-sixth embodiment referring to FIG. 4. In FIG. 4, an equipment such as the emergency communication system terminal unit 1, to which the emergency communication conveying means 2 can be connected, confirms normal operation of the emergency communication conveying means 2 using radio communication device adopted in the emergency communication system. When it is not possible to confirm normal connection from the reason such as removal of the emergency communication conveying means 2, the data is outputted, indicating that it is not possible to confirm normal connection from the reason such as removal of the emergency communication conveying means 2 from the emergency communication system terminal unit 1. When the data indicating that it is not possible to confirm normal connection from the reason such as removal of the emergency communication conveying means 2 according to the status information, the information transmitting means 6 transmits that it is not possible to confirm normal connection from the reason such as removal of the emergency communication means 2 by the means such as buzzer, LED, etc. for transmitting information to the user.

Further, the control unit 12 in the emergency communication system terminal unit 1 outputs the data that information has been transmitted to the user because it was not possible to confirm normal connection from the reason such as removal of the emergency communication conveying means 2. The data is outputted to the storage unit 15 in the emergency communication system terminal unit 1. Based on the data indicating that information has been transmitted to the user because it was not possible to confirm normal connection from the reason such as removal of the emergency communication conveying means 2, the storage unit 15 records on a storage element such as memory that information has been transmitted to the user because it was not possible to confirm normal connection of the emergency communication conveying means 2 from reason such as failure.

(Embodiment 67)

Description will be given below on the emergency communication system of the present invention in a sixty-seventh embodiment referring to FIG. 6. In FIG. 6, the sixty-seventh embodiment is used to output the data, indicating that it is not possible to confirm normal connection of the emergency communication conveying means 2 from the reason such as removal or that information has been transmitted to the user because it was not possible to confirm normal connection from the reason such as removal. The data is outputted to an external equipment connected to the emergency communication system terminal unit 1 using an external interface (not shown). It is used for the purpose of identifying operation status of the emergency communication system terminal unit 1 based on the data such as history of maintenance, failure or removal.

Next, description will be given on operation of the sixty-seventh embodiment. In FIG. 6, an equipment such as the emergency communication system terminal unit 1, to which the emergency communication conveying means 2 can be connected, confirms normal operation of the emergency communication conveying means 2 using radio communication device as adopted in the emergency communication system. When it is not possible to confirm normal connection of the emergency communication conveying means 2 from the reason such as removal or when information has been transmitted to the user because it was not possible to confirm normal connection from the reason such as removal, the control unit 2 in the emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to the storage unit 15 in the emergency communication system terminal unit 1. The storage unit 15 records the data indicating that it is not possible to confirm normal connection of the emergency communication conveying means 2 from the reason such as failure or that information has been transmitted to the user because it was not possible to confirm normal connection from the reason such as failure as information.

Further, the external equipment connection interface 7 inputs a request of history data from the externally connected equipment. The control unit 12 instructs to output to the storage unit 15 the corresponding history data by a request signal of the history data inputted via the external equipment connection interface 7. In response to the data request from the control unit 12, the storage unit 15 outputs the history data stored in the storage element such as memory to the control unit 12. The control unit 12 outputs the data from the storage unit 15 using a predetermined same format signal as the external equipment via the external equipment connection interface 7.

(Embodiment 68)

The emergency communication system of the present invention in a sixty-eighth embodiment is achieved using a non-synchronizing serial signal capable to transmit signal only with data signal. When the data (indicating that it is not possible to confirm normal connection of the emergency communication conveying means 2 from the reason such as failure or that information has been transmitted to the user because it was not possible to confirm normal connection from the reason such as failure) is outputted to an external equipment connected to the emergency communication system terminal unit 1 using an external interface (not shown), the present embodiment defines a signal format of the emergency communication system terminal unit 1 and the external equipment connection interface. The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to an external equipment connected to the external equipment connection interface 7 using non-synchronizing serial signal.

(Embodiment 69)

The emergency communication system of the present invention in a sixty-ninth embodiment is achieved using a serial signal synchronized with clock signal, frame signal, etc. When the data (indicating that it is not possible to confirm normal connection of the emergency communication conveying means 2 from the reason such as failure or that information has been transmitted to the user because it was not possible to confirm normal connection from the reason such as failure) is outputted to an external equipment connected to the emergency communication system terminal unit 1 using an external interface (not shown), the present embodiment defines a signal format of the emergency communication system terminal unit 1 and the external equipment connection interface. The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to an external equipment connected to the external equipment connection interface 7 using synchronizing serial signal.

(Embodiment 70)

The emergency communication system of the present invention in a seventieth embodiment is achieved using A bus communication signal for transmitting and receiving the data by parallel signal. When the data (indicating that it is not possible to confirm normal connection of the emergency communication conveying means 2 from the reason such as failure or that information has been transmitted to the user because it was not possible to confirm normal connection from the reason such as failure) is outputted to an external equipment connected to the emergency communication system terminal unit 1 using an external interface (not shown), the present embodiment defines a signal format of the emergency communication system terminal unit 1 and the external equipment connection interface. The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to an external equipment connected to the external equipment connection interface 7 using THE bus communication signal.

(Embodiment 71)

The emergency communication system of the present invention in a seventy-first embodiment is achieved using a LAN signal such as IE-BUS system, ARCNET system, etc.

to achieve communication using a plurality of connection devices. When the data (indicating that it is not possible to confirm normal connection of the emergency communication conveying means 2 from the reason such as failure or that information has been transmitted to the user because it was not possible to confirm normal connection from the reason such as failure) is outputted to an external equipment connected to the emergency communication system terminal unit 1 using an external interface (not shown), the present embodiment defines a signal format of the emergency communication system terminal unit 1 and the external equipment connection interface. The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to an external equipment connected to the external equipment connection interface 7 using the LAN signal.

(Embodiment 72)

The emergency communication system of the present invention in a seventy-second embodiment is achieved using an infrared signal capable to transmit and receive the data without requiring wired connection. When the data (indicating that it is not possible to confirm normal connection of the emergency communication conveying means 2 from the reason such as failure or that information has been transmitted to the user because it was not possible to confirm normal connection from the reason such as failure) is outputted to an external equipment connected to the emergency communication system terminal unit 1 using an external interface (not shown), the present embodiment defines a signal format of the emergency communication system terminal unit 1 and the external equipment connection interface. The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to an external equipment connected to the external equipment connection interface 7 using the infrared signal.

(Embodiment 73)

The emergency communication system of the present invention in a seventy-third embodiment is achieved using a radio signal based on electric waves capable to transmit and receive the data without requiring wired connection. When the data (indicating that it is not possible to confirm normal connection of the emergency communication conveying means 2 from the reason such as failure or that information has been transmitted to the user because it was not possible to confirm normal connection from the reason such as failure) is outputted to an external equipment connected to the emergency communication system terminal unit 1 using an external interface (not shown) without requiring wired connection, the present embodiment defines a signal format of the emergency communication system terminal unit 1 and the external equipment connection interface. The emergency communication system terminal unit 1 outputs the data (indicating that it is not possible to confirm normal connection of the emergency communication conveying means 2 from the reason such as failure or that information has been transmitted to the user because it was not possible to confirm normal connection from the reason such as failure) to an external equipment connected to the external equipment connection interface 7 using the radio signal.

INDUSTRIAL APPLICABILITY

As it is evident from the above description, according to the present invention, it is possible to ensure reliable operation of the emergency communication conveying means while the vehicle is being driven by confirming normal operation of the emergency communication conveying means using radio communication device commonly adopted in the emergency communication system.

What is claimed is:

1. An emergency communication system comprising:
    an emergency communication system terminal unit installed on a vehicle;
    an emergency communication device connected to said terminal unit so that a signal can be transmitted and received by said communication device, said emergency communication system transmits emergency information to a predetermined communication partner via said emergency communication device;
    whereby said emergency communication system further comprises:
    means for detecting whether or not said emergency communication device is connected to said emergency communication system terminal unit so that a signal can be transmitted by the communication device and received by the communication system terminal unit; and
    means for prohibiting advancing movement of the vehicle when it is detected that the communication device is not within the vehicle and not connected to the communication system terminal unit.

2. An emergency communication system according to claim 1, wherein a handy phone is used as said emergency communication device, and a telephone number specific to said handy phone is collated with a telephone number stored in the communication system in advance, and if the two telephone numbers do not agree with each other, operation of a starting system of the vehicle is turned to a disable status.

3. An emergency communication system according to claim 1, wherein, in case automatic transmission is adopted in the vehicle, operation of the starting system of the vehicle is turned to a disable status so that a shift knob cannot be shifted from a parking position to a drive position.

4. An emergency communication system according to claim 1, wherein operation of a starting system of the vehicle is turned to a disable status by prohibiting the release of a parking brake of the vehicle.

5. An emergency communication system according to claim 1, wherein in case it is not possible to confirm normal connection of the emergency communication device to the emergency communication system terminal unit, there is further provided means for transmitting information to a user that it is not possible to confirm normal connection of the emergency communication device.

6. An emergency communication system according to claim 1, wherein an indicator is provided on a dashboard where instruments are installed, and said indicator is used for indicating that it is not possible to confirm normal connection of the emergency communication device.

7. An emergency communication system according to claim 1, wherein, in case it is not possible to confirm normal connection of the emergency device to the emergency communication system terminal unit, there is provided further means for recording data incident to the non-connection event.

* * * * *